(12) United States Patent
Kuchi et al.

(10) Patent No.: US 12,034,530 B2
(45) Date of Patent: Jul. 9, 2024

(54) METHOD OF DETERMINING MODULATION AND CODING SCHEME (MCS) AND A SYSTEM THEREOF

(71) Applicants: INDIAN INSTITUTE OF TECHNOLOGY HYDERABAD, Sangareddy (IN); WISIG NETWORKS PRIVATE LIMITED, Hyderabad (IN)

(72) Inventors: Kiran Kumar Kuchi, Hyderabad (IN); Saidhiraj Amuru, Hyderabad (IN)

(73) Assignees: INDIAN INSTITUTE OF TECHNOLOGY HYDERABAD (IITH) (IN); WISIG NETWORKS PRIVATE LIMITED (IN)

(*) Notice: Subject to any disclaimer, the term of this patent is extended or adjusted under 35 U.S.C. 154(b) by 525 days.

(21) Appl. No.: 17/284,230

(22) PCT Filed: Nov. 18, 2019

(86) PCT No.: PCT/IN2019/050853
§ 371 (c)(1),
(2) Date: Apr. 9, 2021

(87) PCT Pub. No.: WO2020/110170
PCT Pub. Date: May 22, 2020

(65) Prior Publication Data
US 2021/0344439 A1    Nov. 4, 2021

(30) Foreign Application Priority Data
Nov. 18, 2018 (IN) .............................. 201841043360

(51) Int. Cl.
*H04L 1/00* (2006.01)
*H04B 7/0417* (2017.01)
(Continued)

(52) U.S. Cl.
CPC ......... *H04L 1/0003* (2013.01); *H04B 7/0417* (2013.01); *H04B 7/0626* (2013.01);
(Continued)

(58) Field of Classification Search
None
See application file for complete search history.

(56) References Cited

U.S. PATENT DOCUMENTS

2008/0181285 A1   7/2008  Hwang et al.
2010/0113048 A1*  5/2010  Sawahashi ............ H04L 1/0004
                                                      455/450
(Continued)

OTHER PUBLICATIONS

Int'l Search Report and Written Opinion Appln No. PCT/IN2019/050853 dated Mar. 2, 2020.

*Primary Examiner* — Minh Trang T Nguyen
(74) *Attorney, Agent, or Firm* — McAndrews, Held & Malloy, Ltd.

(57) ABSTRACT

Embodiments herein provide method of determining modulation and coding scheme (MCS) at a base station (BS). The method comprises obtaining, by the BS, downlink channel state information (DL-CSI) corresponding to a plurality of UEs. Also, the method comprises receiving feedback from the plurality of UEs, said feedback is at least one of explicit interference power and noise power feedback, post processing signal power-to-interference power plus noise power-based and determining MCS associated with a subset of UEs from the plurality of UEs using a predefined mapping between the MCS and a combination of DL-CSI and the feedback from the plurality of UEs. Further, the method comprises indicating the determined MCS to the subset of UEs from the plurality of UEs.

8 Claims, 12 Drawing Sheets

(51) Int. Cl.
*H04B 7/06* (2006.01)
*H04B 17/336* (2015.01)
(52) U.S. Cl.
CPC ......... *H04B 7/0634* (2013.01); *H04B 7/0639* (2013.01); *H04B 17/336* (2015.01)

(56) References Cited

U.S. PATENT DOCUMENTS

2012/0114062 A1* 5/2012 Zhang .................. H04L 5/0035
 375/285
2016/0043783 A1* 2/2016 Xia ...................... H04B 7/0626
 370/329

* cited by examiner

METHOD OF DETERMINING MODULATION AND CODING SCHEME (MCS) AND A SYSTEM THEREOF

CROSS-REFERENCE TO RELATED APPLICATIONS

The present application is a national stage application under 35 U.S.C. § 371 of application Serial No. PCT/IN2019/050853, filed on Nov. 18, 2019, and entitled "METHOD OF DETERMINING MODULATION AND CODING SCHEME (MCS) AND A SYSTEM THEREOF", which claims priority to Indian Patent Application No. 201841043360, filed Nov. 18, 2018 of which are hereby incorporated by reference in their entireties. The aforementioned application is hereby incorporated herein by reference in its entirety.

TECHNICAL FIELD

The embodiments herein relate to wireless communication, and more particularly to a method of determining modulation and coding scheme (MCS) at a base station (BS).

BACKGROUND

The existing systems such as long-term evolution (LTE) and wireless local area network (WLAN) adopt multiple-input-multiple-output (MIMO) technology as a part of the standards. The MIMO can be classified as single user MIMO (SU-MIMO), multi-user MIMO (MU-MIMO). In SU-MIMO, a transmitter employing multiple antennas communicates with a receiver/user employing multiple receiver antennas. In MU-MIMO, a transmitter employing multiple antennas communicates with multiple users, where each user may have a single or multiple antennas.

Among the class of MU-MIMO techniques, one method uses massive MIMO, where a transmitter or base station (BS) employs a large number of co-located antennas to serve one or more users within the coverage area of BS. Another method that has gained importance in recent years is cloud radio access network (C-RAN) or distributed antenna system (DAS). In the C-RAN (as shown in the FIGS. 1 and 2), the base station uses centralized baseband band processing in which a large number of spatially distributed antennas serve a number of users where each user may have single or multiple antennas. The C-RAN uses MU MIMO principles.

In the cloud RAN, a number of remote radio heads (RRHs) are connected to a central processor by fiber or copper links or high-speed wireless link. The RRHs performs signal up-conversion, down-conversion at RF carrier frequencies. The RRH to central processor link carries baseband In-phase quadrature (I/Q) signal samples. The central processor performs baseband processing for all the RRHs. The architecture may involve a number of RRHs that may be either collocated or distributed. Each RRH may have multiple antenna ports that are used to transmit signals using spatially separated antennas. The architecture may include a set of massive MIMO base stations connected to a core network or a cloud radio with distributed RRHs. In case of massive MIMO, the cloud becomes highly localized cloud that performs baseband processing for all the antenna ports. In case of C-RAN, joint processing is performed for a group of RRHs resulting in a cluster. Clusters of clouds encompassed a cloud network.

In MU-MIMO/cloud-RAN/massive MIMO, the BS or cloud collects channel state information (CSI) from the users and uses this information to design a linear or non-linear precoder to achieve interference free communication in the downlink. In the uplink, the CSI corresponding to multiple users can be estimated at the BS or the cloud and the receiver/user this information to eliminate possible interference that arises between the signals transmitted by one or more users.

Availability of baseband signals corresponding to all the user equipment (UEs) in the network provides multiple benefits including simplified user scheduling, automatic load balancing and the like. As the density of the RRHs grow, transmit power of the Base Station (BS) can be reduced to low values without compromising the network performance. In conventional networks, such high-density deployment may lead to frequent handovers.

In conventional systems, the base station may employ spatial multiplexing (SM) techniques using multiple antennas in downlink. Similarly, the cloud radio may be designed to handle multi-stream transmission from each TP. The FIGS. 1 and 2 shows a high-level architecture of a CRAN. In a cloud radio, the network may assign the base station identification (BS ID) number to a group of antenna ports while individual antenna ports may be given a unique antenna port number.

Because of practical considerations, a finite set of BSs/ATPs/RRHs are connected to one cloud and other sets of BSs/ATPs/RRHs are connected to other clouds forming clusters of cloud radios. In such scenarios, cooperation is applied to BSs/ATPs/RRHs within a cluster. Because of limited cooperation, interference arises at the UE due to other cluster interference in the downlink.

In a cloud radio system employing different carrier frequencies for downlink and uplink called a frequency division duplex (FDD) cloud radio, the CSI of downlink channels are fed back by the UEs to the base station with regular periodicity resulting in high overhead. However, in cloud radio systems employing time division duplexing (TDD) the available frequency resources are used between downlink and uplink in TDD mode. In such cases, the CSI of downlink channel can be obtained from the CSI measurements obtained from the uplink. However, since the RF filters used in the downlink and uplink transmission paths can be different, the measured downlink CSI differs from that of uplink CSI. A method called channel calibration is applied at the BS/cloud to obtain the downlink CSI.

A massive MIMO system is a BS that employs a large antenna array for MIMO operation. In such a system multiple user can be scheduled in the same time frequency resource and interference between user signals in downlink can be nulled using a linear or non-linear precoder at the BS. The massive MIMO can be viewed as a special case of cloud radio where a large number of antennas are grouped and are collocated at one place. A collection of geographically distributed massive MIMO BSs form a massive MIMO network. The massive MIMO BS may be connected to a cloud using fiber type back-haul or using standard backhaul. The techniques that will be presented in the foregoing are applicable to both cloud RAN and massive MIMO systems.

The massive MIMO may also include a system where the BS uses a large antenna array to create a set of fixed beams (radiation patterns in azimuth and elevation). This method can be viewed as a form of sectorization where a 360- or 120-degree sector can be divided to a number of sub-sectors. For example, one 360-degree Omni-directional BS can employ 6 or 12 sectors or a BS that covers 120 degrees can further employ 6 additional beams each with 20-degree beam width or beams with unequal beam width. In such systems, each BS uses a number of PA outputs (or data streams), where each PA output is fed to one or more beams. Downlink CSI reference signals may be transmitted per PA output so that the user feedback the downlink measured CSI for each PA output. If one beam is fed with one PA output, the user feedback represents the CSI of each beam. The BS may use MU MIMO techniques such as linear or non-linear precoding to mitigate inter-beam or inter-user interference.

In systems with dynamic beamforming, the CSI reference signals are transmitted using a larger number of antenna ports (or PA outputs) so that the user feedback the downlink CSI of a number of antenna ports. The BS may apply MU MIMO transmission using linear or non-linear precoding using a larger antenna array. This method may include a combination of digital (baseband) precoding and radio frequency (RF) beamforming also. This is called hybrid beamforming. The antenna weights at the RF level may include amplitude or phase or a combination of amplitude and phase.

In cloud RAN systems that employ a number of antenna ports at each RRH, one may apply similar MU MIMO principles. The cloud RAN system may comprise of single antenna per RRH or multiple antenna per RRH employing fixed sectorization or multiple antenna per RRH employing dynamic beamforming.

For every user scheduled by the base station or the CRAN unit, it must be allotted a specific modulation and coding scheme using which data is sent to the UE. This MCS setting is as per the channel conditions seen by the user. Better channel conditions imply that the UE can be assigned better MCS such as higher order modulation scheme such as 256-QAM with higher code rates and worst channel means the UE will be assigned lower order modulation schemes such as BPSK and QPSK with low code rates (heavy coding) to ensure decoding can happen. This setting of MCS is very crucial because setting a wrong MCS can lead to heavy retransmissions and setting a conservative MCS can lead to overall lesser network throughput. Typically, this MCS will be set as per the true channel conditions seen at the user in the downlink and SINR metric is one way which can be used to identify this channel conditions and then set this MCS for the user. Hence, getting the correct SINR value is crucial for the base station and it must be available from each user.

SUMMARY

The shortcomings of the prior art are overcome and additional advantages are provided through the provision of method of the present disclosure.

Additional features and advantages are realized through the techniques of the present disclosure. Other embodiments and aspects of the disclosure are described in detail herein and are considered a part of the claimed disclosure.

In one aspect of the present disclosure method of determining modulation and coding scheme (MCS) at a base station (BS) is disclosed. The method comprises obtaining, by the BS, downlink channel state information (DL-CSI) corresponding to a plurality of UEs. Also, the method comprises receiving feedback from the plurality of UEs, said feedback is at least one of explicit interference power and noise power feedback, post processing signal power-to-interference power plus noise power-based and determining MCS associated with a subset of UEs from the plurality of UEs using a predefined mapping between the MCS and a combination of the DL-CSI and the feedback from the plurality of UEs. Further, the method comprises indicating the determined MCS to the subset of UEs from the plurality of UEs.

In another aspect of the present disclosure a base station (BS) to determine modulation and coding scheme (MCS) is disclosed. The BS comprises a channel state information unit, a receiver unit, a MCS unit and a transmitting unit. The channel state information unit obtains a downlink channel state information (DL-CSI) corresponding to a plurality of UEs. The receiver unit receives feedback from the plurality of UEs, said feedback is at least one of explicit interference power and noise power feedback, post processing signal power-to-interference power plus noise power-based. The MCS unit determines MCS associated with a subset of UEs from the plurality of UEs using a predefined mapping between the MCS and a combination of DL-CSI and the feedback from the plurality of UEs. The indicating unit to indicate the determined MCS to the subset of UEs from the plurality of UEs.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

This method is illustrated in the accompanying drawings, throughout which like reference letters indicate corresponding parts in the various figures. The embodiments herein will be better understood from the following description with reference to the drawings, in which.

DETAILED DESCRIPTION

Figure 1:
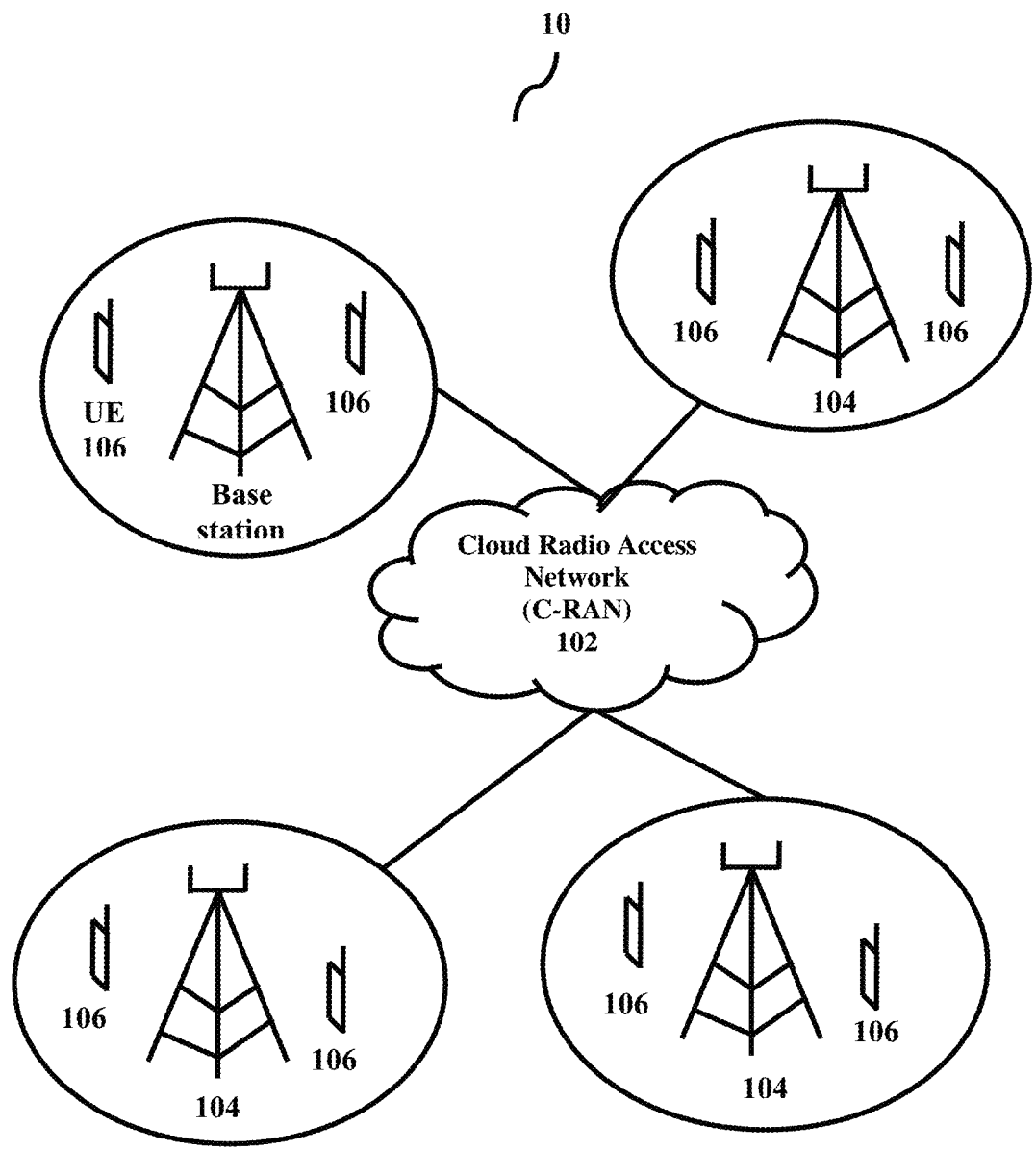
FIG. 1 illustrates a high-level architecture of a Cloud Radio Access Network (C-RAN)

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

In MIMO systems, precoding techniques can be subdivided into linear and nonlinear precoding types. The capacity achieving algorithms are nonlinear, but linear precoding approaches usually achieve reasonable performance with much lower complexity. Linear precoding strategies include maximum ratio transmission (MRT), zero-forcing (ZF) precoding, and a regularized MMSE precoding. Nonlinear precoding may include Tomlinson Harashima Precoding (THP), vector perturbation, lattice-based strategies among others. Throughout the description the terms cloud system and central processing are used interchangeably.

Accordingly, embodiments herein provide a method of determining modulation and coding scheme (MCS) at a base station (BS) is disclosed. The method comprises obtaining, by the BS, downlink channel state information (DL-CSI) corresponding to a plurality of UEs. Also, the method comprises receiving feedback from the plurality of UEs, said feedback is at least one of explicit interference power and noise power feedback, post processing signal-to-interference plus noise-based and determining MCS associated with a subset of UES from the plurality of UEs using a predefined mapping between the MCS and the DL-CSI plus the feedback from the plurality of UEs. Further, the method comprises indicating the determined MCS to the subset of UEs from the plurality of UEs.

Accordingly, embodiments herein provide a base station (BS) to determine modulation and coding scheme (MCS) is disclosed. The BS comprises a channel state information unit, a receiver unit, a MCS unit and a transmitting unit. The channel state information unit obtains a downlink channel state information (DL-CSI) corresponding to a plurality of UEs. The receiver unit receives feedback from the plurality of UEs, said feedback is at least one of explicit interference power and noise power feedback, post processing signal power-to-interference power plus noise power-based feedback. The MCS unit determines MCS associated with a subset of UEs from the plurality of UEs using a predefined mapping between the MCS and the DL-CSI plus the feedback from the plurality of UEs. The indicating unit to indicate the determined MCS to the subset of UEs from the plurality of UEs.

Also, embodiments of the present disclosure provide a method of pilot transmission, precoding and signal decoding. Further, the method can be used for estimating magnitude and phase of the data symbols more accurately. The method uses a pilot transmission method that allows the pilots to experience the entire THP operation so that the received pilots facilitate estimation of the phase and/or magnitude of diagonal elements of the interference free channel matrix created by forming virtual beams to the users. Furthermore, the method provides high network capacity with significantly better quality of service (QoS).

Figure 2:
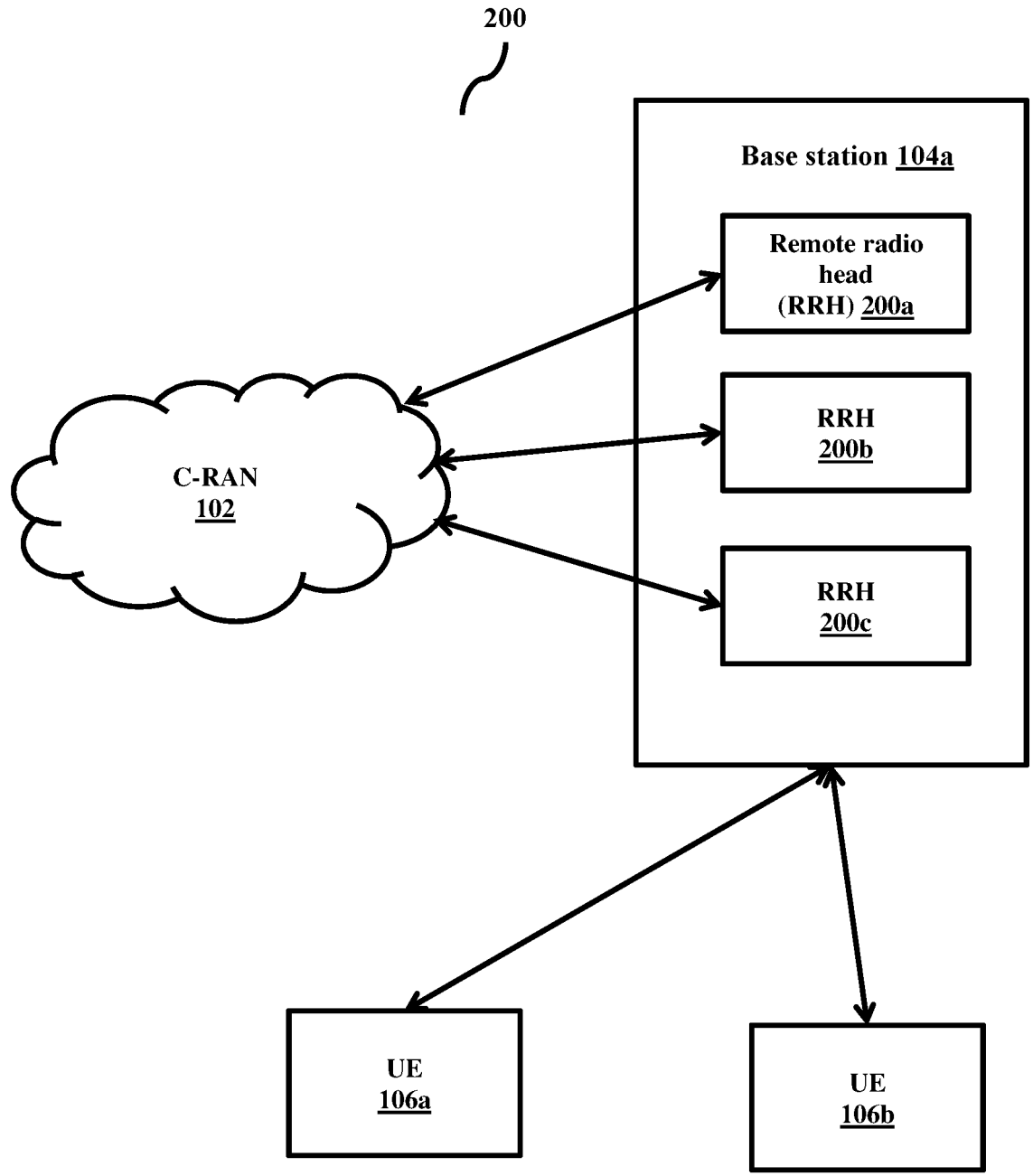
FIG. 2 illustrates an architecture of the C-RAN with RRHs and user equipment's (UEs), according to an embodiment as disclosed herein.

FIG. 2 illustrates an architecture 200 of the C-RAN with RRHs and user equipment's (UEs), according to an embodiment as disclosed herein. As depicted in the FIG. 2, the architecture 200 includes a C-RAN 102, a set of RRHs 200a, 200b and 200c and the UEs 106a and 106b. The set of RRHs 200a, 200b and 200c form a cluster and communicate with the C-RAN 102. Each RRH includes multiple antenna ports that are used to transmit signals using spatially separated antennas. The C-RAN 102 is a cloud system which performs central processing of the base band associated with the set of RRHs. The C-RAN 102 performs joint processing for the set of RRHs 200a, 200b and 200c in the cluster. The UEs 106a and 106c may employ multiple antenna ports for reception or for transmission. Although in the FIG. 2, only one cluster is shown, it should be noted that the architecture 200 includes a plurality of clusters, where each cluster includes a set of RRHs.

Figure 3:
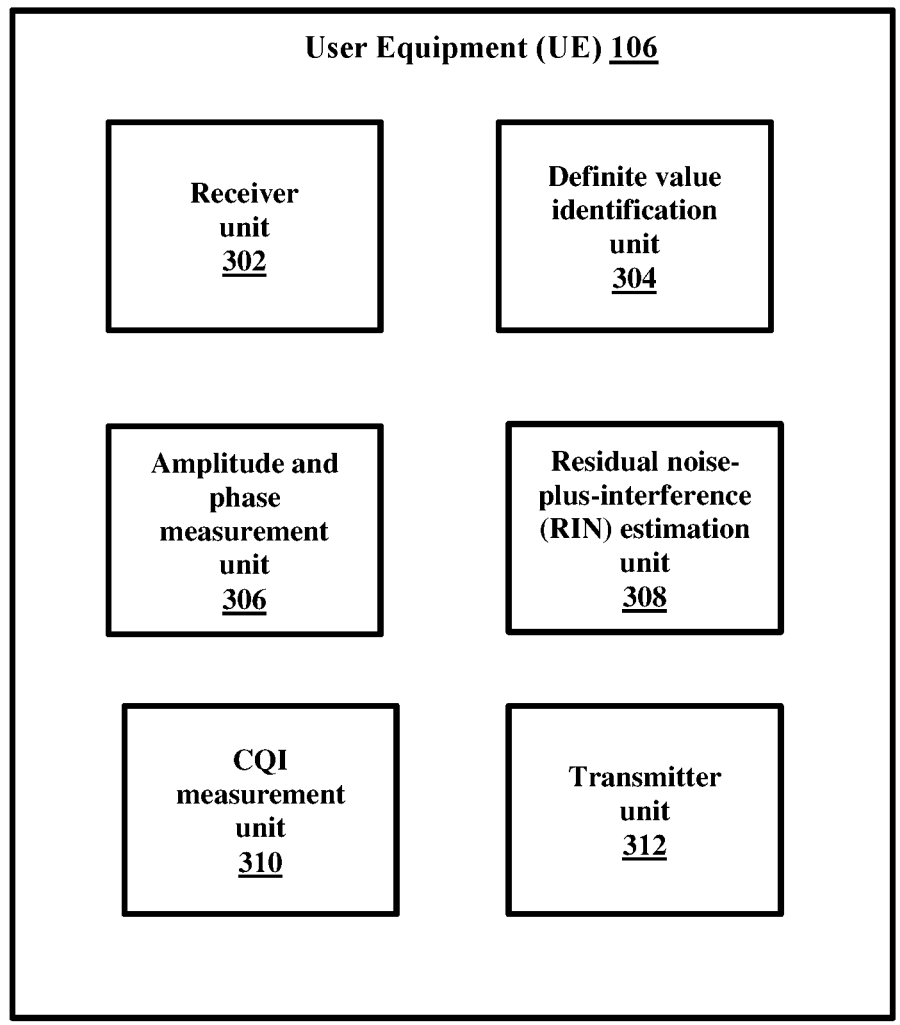
FIG. 3 illustrates various units in the UE, according to an embodiment as disclosed herein.

FIG. 3 illustrates various units in the UE 106a, according to an embodiment as disclosed herein. As depicted in the FIG. 3, the UE 106 includes a receiver unit 302, a definite value identification unit 304, an amplitude and phase measurement unit 306, a residual noise-plus interference (RIN) estimation unit 308 and a CQI measurement unit 310.

In an embodiment, the receiver unit 302 receives the signal with encoded pilots from the C-RAN 102. In an example, the received signal can be represented as $$y=Hx+n$$

where y is a received signal vector and 'H' denotes a channel matrix.

In an embodiment, the receiver unit 302 decomposes the Channel matrix H to L and Q matrices using LQ decomposition, where L is a lower triangular matrix and Q is a Unitary matrix. Practically, QR decomposition of H* is implemented. L and Q values are derived from R* and Q*, where R is an upper triangular matrix. The QR decomposition always exists, even if the matrix does not have full rank, so the constructor will never fail. The primary use of the QR decomposition is in the least squares solution of non-square systems of simultaneous linear equations. In an embodiment comprising 3 BSs/RRHs, the 'L' matrix can be represented as mentioned below.

$$L = \begin{bmatrix} l_{11} & 0 & 0 \\ l_{2l} & l_{22} & 0 \\ l_{31} & l_{32} & l_{33} \end{bmatrix}$$

Further, the receiver unit 302 sends the received signal to the definite value identification unit 304. In an embodiment, the definite value identification unit 304 identifies the definite value from the plurality of the values in the L matrix from the received signal. The diagonal elements in the 'L' matrix denote definite values. In the matrix L, l11, l22 and l33 denote the definite values. The definite value l11 is intended to the UE 106a. In an embodiment, the cloud communicates to the UE the index associated with the definite value so that appropriate received pilots can be selected for estimation of amplitude and phase. In another embodiment, an antenna port mapping is defined wherein the antenna port number corresponds to a pilot sequence (associated with the ID) assigned to a UE and also the resource elements where these sequences are mapped. The definite value l22 is intended to the UE 106b. The definite value l33 is intended to the UE 106c. Further, the definite value identification unit 304 sends the identified definite values to the amplitude and phase measurement unit 306.

In an embodiment, the amplitude and phase measurement unit 306 measures the amplitude and phase of the identified definite value in the L matrix. The amplitude and phase of the l11, l22 and l33 in the L matrix is measured by utilizing the encoded pilots in the received signal.

In an embodiment, the RIN estimation unit 308 estimates the RIN in each RE in the received signal. In an embodiment, the RIN estimation unit 308 divides the signals received in the null positions by the magnitude of appropriate diagonal values and uses these observations for estimating the residual noise-plus-interference power. Multiple such null pilot positions may be used to average the noise-plus-interference power estimates to obtain the estimate of RIN.

In an embodiment, the noise estimation unit estimates noise power on the null tones configured by the base station or using the known reference signals (pilots). The interference estimation unit can estimate the interference faced by the users from other cells on the pilots configured by the base station.

In an embodiment, the CQI measurement unit 310 measures the CQI based on the measured amplitude, phase, the estimated RIN, the estimated noise and the estimated interference. The CQI measurement unit 310 measures the received signal a square of the diagonal element for each RE.

In an embodiment, the CQI measurement unit 310 performs an average of the RNI values over multiple RE elements to obtain average RNI. In another embodiment, the noise values are estimated over several resource elements to obtain an average noise power estimate. Similarly, the interference power can also be averaged over several resource elements to obtain an average interference estimate. The measurement window may span a group of subcarriers in frequency and a group of subcarriers in time. The ratio of signal-power of a RE to average RNI may also provide an estimate of SINR for the RE. The CQI measurement unit 310 uses SINR estimates of multiple REs to map it to a single effective SINR or a CQI value that corresponds to a modulation and coding scheme (MCS).

The transmitter unit 312 transmits the measured CQI to the CR-RAN 102. In an example, the transmitter unit 312 feeds back the measured CQI to the CR-RAN 102.

Figure 4:
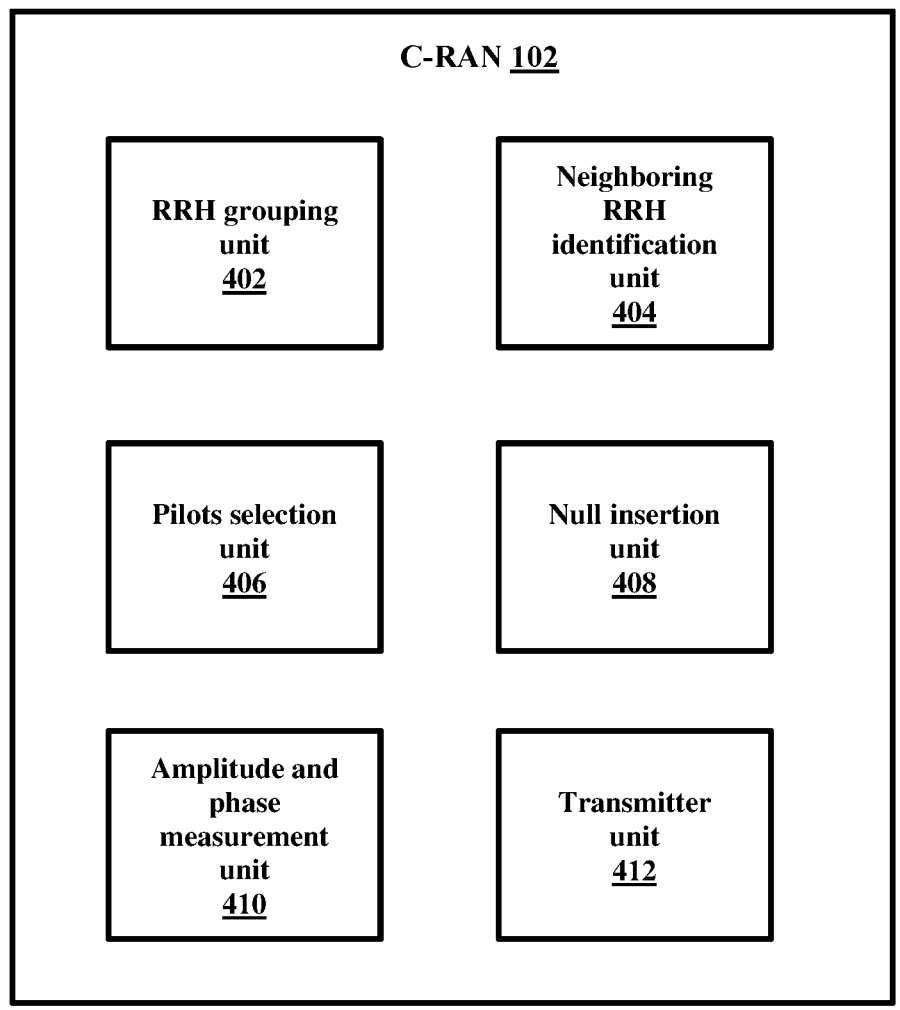
FIG. 4 illustrates various units in the C-RAN, according to an embodiment as disclosed herein.

FIG. 4 illustrates various units in the C-RAN 102, according to an embodiment as disclosed herein. As depicted in the FIG. 4, the C-RAN 102 includes a RRH grouping unit 402, a neighboring RRH identification unit 404, pilot's selection unit 406 and a transmitter.

In an embodiment, the RRH grouping unit 402 groups the plurality of RRHs in a cluster. In an example, if the cluster includes 20 RRHs, then the RRH grouping unit 402 groups the 20 RRHs to form a group.

In an embodiment, the neighboring RRH identification unit 404 identifies neighboring RRHs for a particular RRH in the cluster based on intensity of interference. In an example, if there are three RRHs namely A, B and C. Among the three RRHs, B is causing a significant interference and C is not causing interference, then the neighboring RRH identification unit 404 identifies the RRH B as neighboring RRH to the RRH A.

In an embodiment, pilot's selection unit 406 selects the plurality of encoded pilots of neighboring RRHs not causing the interference. In an example, if the RRH C is causing interference among the RRHs A, B and C, then the pilots selection unit 406 selects the encoded pilots for the RRH C, which is not causing the interference.

In an embodiment, the null insertion unit 408 causes to null values of the identified neighboring RRHs causing dominant interference. In an example, if the RRH C is causing interference among the RRHs A, B and C, then the null insertion unit 408 causes to null values of the RRH C.

In an embodiment, the null insertion unit 408 causes to null values of the identified neighboring RRHs causing dormant interference. In an example, if there are three RRHs namely A, B and C. Among the three RRHs, B is causing a significant interference and C is not causing interference, then the null insertion unit 408 causes to null values of RRH C, which is not causing interference.

In an embodiment, null insertion unit 408 causes to selectively null the values in the REs.

In an embodiment, the transmitter unit 412 transmits the plurality of encoded pilots and data to the UE 106a.

In an embodiment, transmitter unit 412 transmits the null values and data to the UE 106a.

Figure 5:
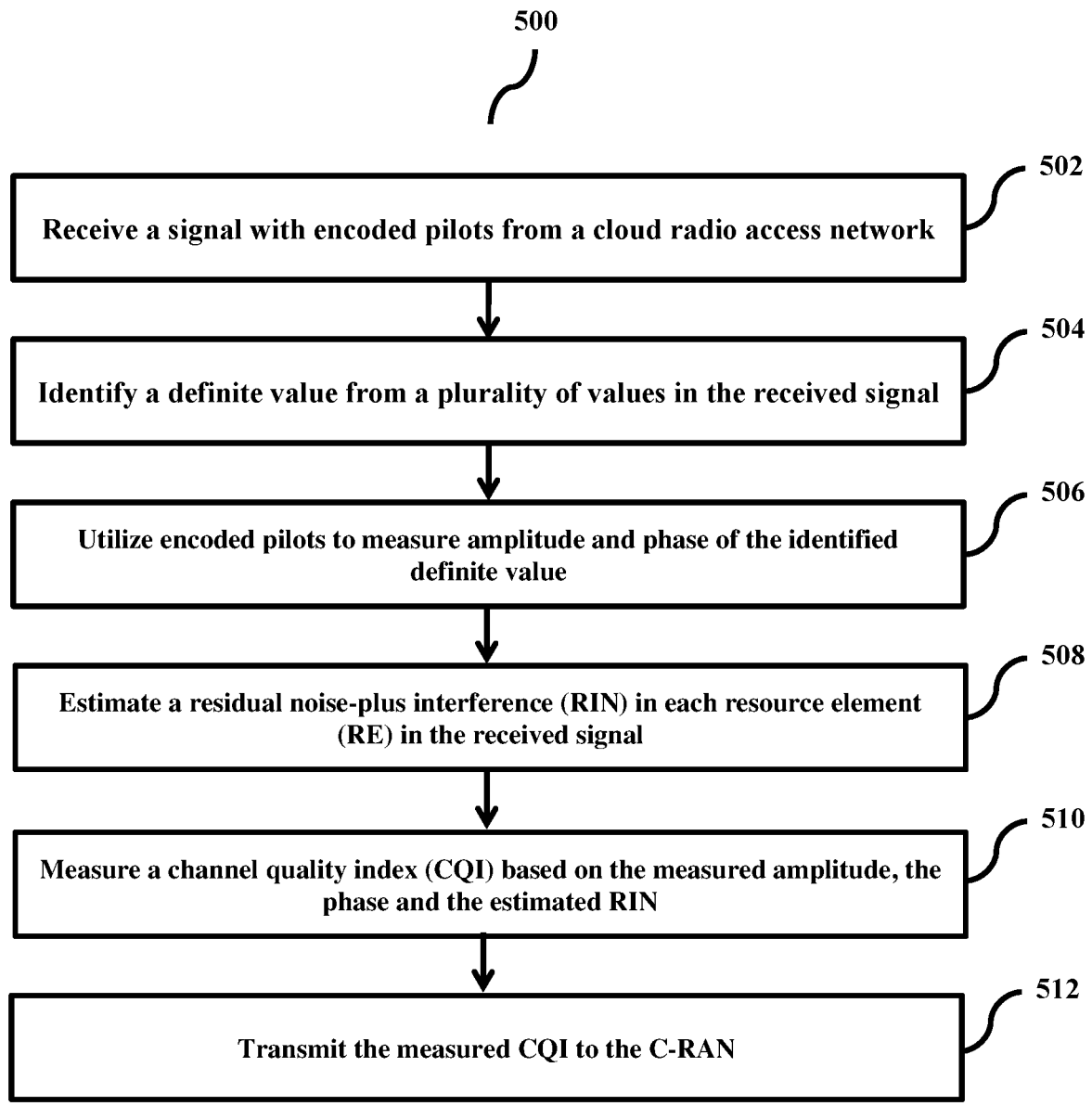
FIG. 5 is a flow diagram illustrating a method for measuring channel quality index (CQI) by the UE, according to an embodiment as disclosed herein.

FIG. 5 is a flow diagram 500 illustrating a method for measuring channel quality index (CQI) by the UE, according to an embodiment as disclosed herein. At step 502, the method includes receiving the signal with the encoded pilots from the C-RAN 102. The method allows the receiver unit 302 to receive the signal with the encoded pilots from the C-RAN 102.

In an embodiment, the receiver unit 302 receives the signal with encoded pilots from the C-RAN 102. In an example, the received signal can be represented as $$y=Hx+n$$

where y is a received signal vector and 'H' denotes a channel matrix.

Further, the receiver unit 302 sends the received signal to the definite value identification unit 304.

At step 504, the method includes identifying the definite value from the plurality of values in the received signal. The method allows the definite value identification unit 304 to identify the definite value from the plurality of values in the received signal. The diagonal elements in the 'L' matrix denote definite values. In the matrix L, $l_{11}$, $l_{22}$ and $l_{33}$ denote the definite values. The definite value $l_{11}$ is intended to the UE 106a. The definite value $l_{22}$ is intended to the UE 106b. The definite value $l_{33}$ is intended to the UE 106c. Further, the definite value identification unit 304 sends the identified definite values to the amplitude and phase measurement unit 306.

At step 506, the method includes utilizing encoded pilots to measure amplitude and phase of the identified definite value. The method allows the amplitude and phase measurement unit 306 to utilize encoded pilots for measuring the amplitude and the phase of the identified definite value. In an embodiment, the amplitude and phase measurement unit 306 measures the amplitude and phase of the identified definite value in the L matrix. The amplitude and phase of the $l_{11}$, $l_{22}$ and $l_{33}$ in the L matrix is measured by utilizing the encoded pilots in the received signal.

At step 508, the method includes estimating RIN in each RE in the received signal. The method allows RIN estimation unit 308 to estimate the RIN in each RE in the received signal. In an embodiment, the RIN estimation unit 308 divides the signals received in the null positions by the magnitude of appropriate diagonal values and uses these observations for estimating the residual noise-plus-interference power. Multiple such null pilot positions may be used to average the noise-plus-interference power estimates to obtain the estimate of RIN. The noise estimation unit, may estimate the noise power and the interference estimation unit may estimate the interference power.

At step 510, the method includes measuring CQI based on the measured amplitude, the phase and the estimated RIN. The method allows the CQI measurement unit to measure the CQI based on the measured amplitude, the phase and the estimated RIN.

At step 512, the method includes transmitting the measured CQI to the C-RAN 102. The method allows the transmitter unit 310 to transmit the measured CQI to the C-RAN 102. In an example, the transmitter unit 312 feedsback the measured CQI to the CR-RAN 102.

Figure 6A:
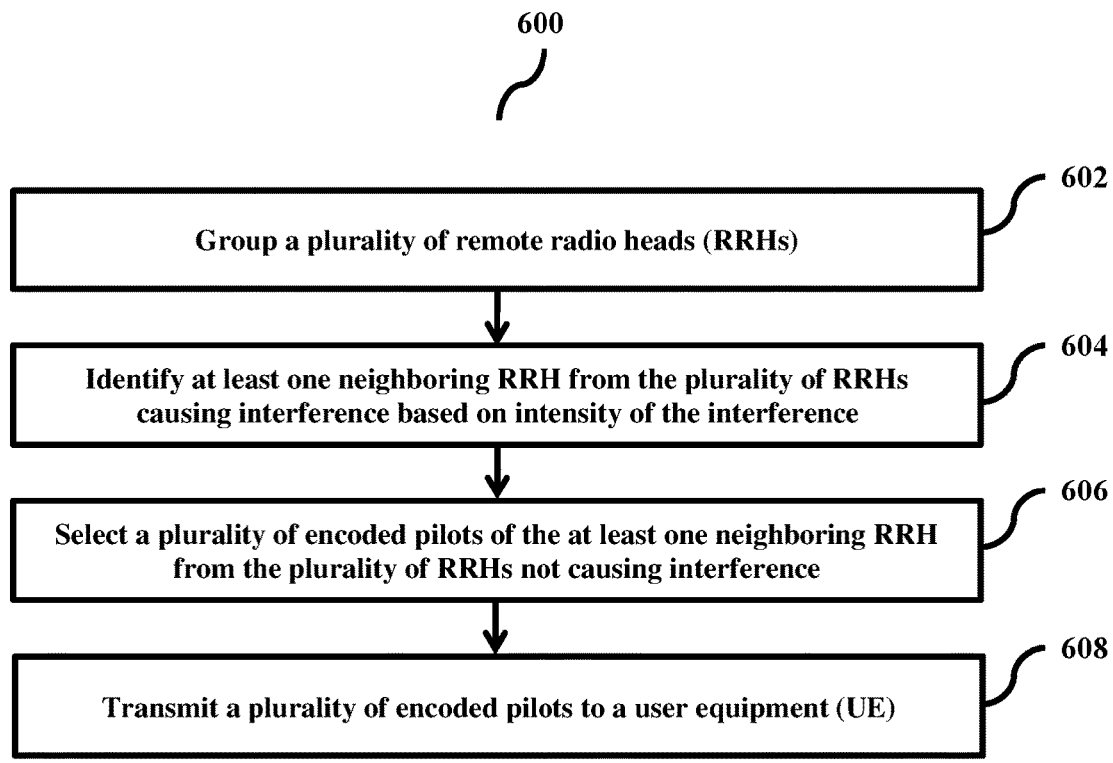
FIG. 6A is a flow diagram illustrating a method for transmitting a plurality of encoded pilots to the UE by the C-RAN, according to an embodiment as disclosed herein.

FIG. 6A is a flow diagram 600a illustrating a method for transmitting a plurality of encoded pilots to the UE by the C-RAN, according to an embodiment as disclosed herein. At step 602a, the method includes grouping a plurality of RRHs. The method allows the RRH grouping unit 402 to group the plurality of RRHs. In an example, if the cluster includes 20 RRHs, then the RRH grouping unit 402 groups the 10 RRHs to form a group.

At step 604a, the method includes identifying at least one neighboring RRH from the plurality of RRHs causing interference based on intensity of the interference. The method allows the neighboring RRH identification unit 404 to identify at least one neighboring RRH from the plurality of RRHs causing interference based on the intensity of the interference. In an example, if there are three RRHs namely A, B and C. Among the three RRHs, B is causing a significant interference and C is not causing interference, then the neighboring RRH identification unit 404 identifies the RRH B as neighboring RRH to the RRH A.

At step 606a, the method includes selecting the plurality of encoded pilots of the at least one neighboring RRH from the plurality of RRHs not causing interference. The method allows pilots selection unit 406 to select the plurality of encoded pilots of the at least one neighboring RRH from the plurality of RRHs not causing interference. In an example, if the RRH C is causing interference among the RRHs A, B and C, then the pilots selection unit 406 selects the encoded pilots for the RRH C, which is not causing the interference.

In an embodiment, the null insertion unit 408 causes to null values of the identified neighboring RRHs causing dominant interference. In an example, if the RRH C is causing interference among the RRHs A, B and C, then the null insertion unit 408 causes to null values of the RRH C.

In an embodiment, the null insertion unit 408 causes to null values of the identified neighboring RRHs causing dormant interference. In an example, if there are three RRHs namely A, B and C. Among the three RRHs, B is causing a significant interference and C is not causing interference, then the null insertion unit 408 causes to null values of RRH C, which is not causing interference.

In an embodiment, null insertion unit 408 causes to selectively null the values in the REs. At step 608a, the method includes transmitting the plurality of encoded pilots to the UE 106. The method allows the transmitter unit 410 to transmit the plurality of encoded pilots to the UE 106.

In an embodiment, the transmitter unit 412 transmits the plurality of encoded pilots and data to the UE 106a.

In an embodiment, transmitter unit 412 transmits the null values and data to the UE 106a.

Figure 6B:
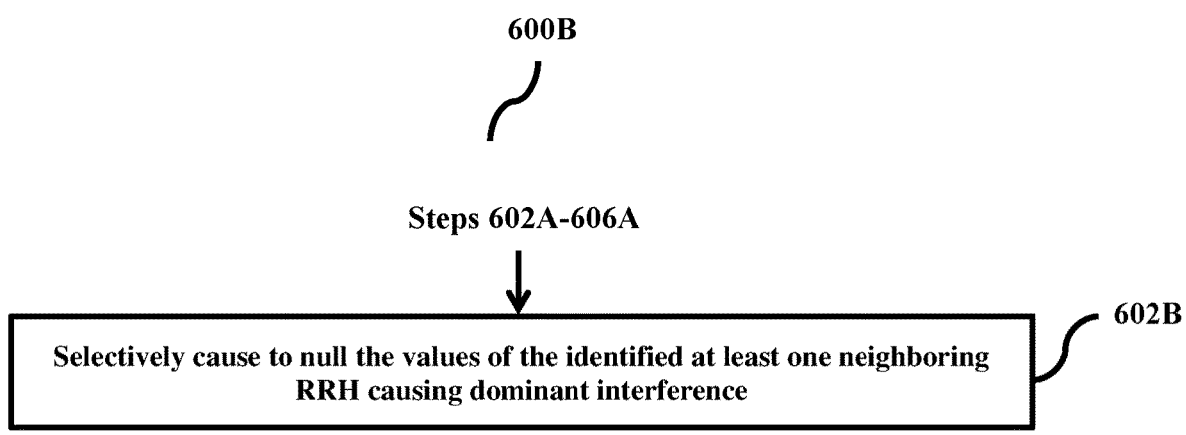
FIG. 6B is a flow diagram illustrating a method for causing to null the values of identified neighboring remote radio heads (RRHs) causing dominant interference, according to an embodiment as disclosed herein.

FIG. 6B is a flow diagram 600B illustrating a method for causing to null the values of identified neighboring remote radio heads (RRHs) causing dominant interference, according to an embodiment as disclosed herein. Initially, the steps 602A-608A is performed as described in the FIG. 6A. At step 602B, the method includes selectively causing to null the values of the identified at least one neighboring RRH causing dominant interference. The method allows the pilots selection unit 406 to selectively null the values of the identified at least one neighboring RRH causing dominant interference. When the total number of streams is large, the resources required for THP based pilot transmission can be large. In such cases the THP pilot vector may comprise of some zero elements and some non-zero elements.

In an embodiment, consider THP pilot vector of form $$\begin{bmatrix} c_1 \\ c_2 \\ c_3 \end{bmatrix}$$

This vector may be transmitted over multiple REs using THP encoding. In successive pilot transmission the values of the pilots may be changed.

In this case, each user applies a scaling by the magnitude of diagonal element. After division by the amplitude and after modulo operation, each user estimates the phase of the received signal over multiple REs and averages this phase for finer estimation. This method requires the amplitude to be estimated by another method. To facilitate amplitude estimation two sets of encoded pilots can be transmitted. The first set comprised of nulls (caused by dominant RRHs) that facilitates amplitude estimation and second set comprises of THP pilot vector of form $$\begin{bmatrix} c_1 \\ c_2 \\ c_3 \end{bmatrix}$$

where pilots cause mutual interference. After division by amplitude and modulo operation, the second set of pilots facilitate finer phase estimation. The number of pilot time/frequency locations (density) used for first set of pilots may be unequal and preferably less than the second set. By having two sets of pilots the total pilot transmission overhead can be reduced. The above length of the pilots depends on the number of users that may be served simultaneously by the base station or the C-RAN system.

Figure 6C:
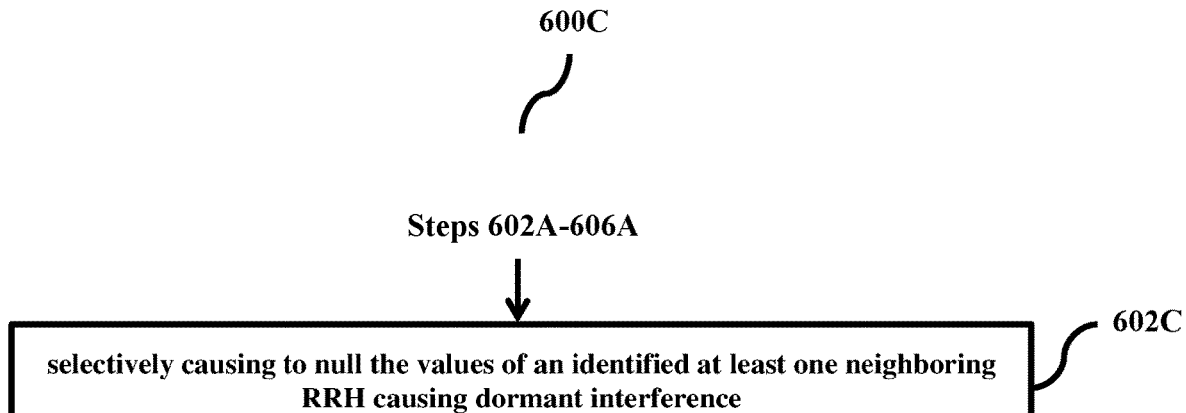
FIG. 6C is a flow diagram illustrating a method for causing to null the values of identified neighboring (RRHs) causing dormant interference, according to an embodiment as disclosed herein.

FIG. 6C is a flow diagram 600C illustrating a method for causing to null the values of identified neighboring (RRHs) causing dormant interference, according to an embodiment as disclosed herein. Initially, the steps 602A-608A is performed as described in the FIG. 6A. At step 602C, the method includes selectively causing to null the values of an identified at least one neighboring RRH causing dormant interference. The method allows pilots selection unit 406 to selectively null the values of an identified at least one neighboring RRH causing dormant interference.

In another embodiment, the BS/cloud transmits a pilot vector where some elements of the THP pilot vector take zero values. For instance, BSs/RRHs that cause high mutual interference mutually mute pilot transmissions whereas the BSs/RRHs that cause less mutual interference transmit THP pilots simultaneously. This can happen at the cloud center or by the BS which knows all the interference a priori. This type of transmission reduces the pilot overhead significantly. For example, referring to FIG. 5, one may use the following pilot transmission, in one set of REs the following pilot vector may be $$\begin{bmatrix} c_1 \\ 0 \\ c_2 \\ 0 \\ c_3 \end{bmatrix}$$

used to avoid mutual interference between the beams in other set of REs the following pilot vector may be used $$\begin{bmatrix} 0 \\ c_4 \\ 0 \\ c_5 \\ 0 \end{bmatrix}.$$

The method 600B can be generalized for arbitrary number of beams/RRHs. The allocation of the pilots can also be done by the base station as per the reference signal port mapping either in a FDM/TDM or a CDM manner. This pattern will depend on the reference signal antenna port mapping assigned to the user.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 6D:
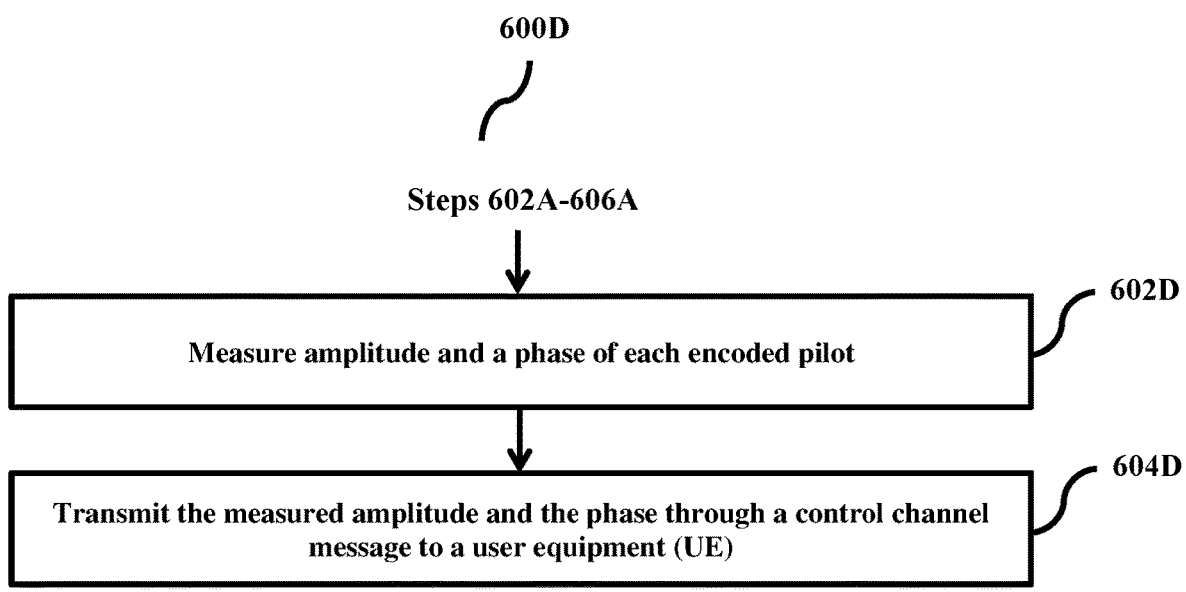
FIG. 6D is a flow diagram illustrating a method for transmitting a measured amplitude and phase associated with each encoded pilot to the UE, according to an embodiment as disclosed herein.

FIG. 6D is a flow diagram 600d illustrating a method for transmitting a measured amplitude and phase associated with each encoded pilot to the UE, according to an embodiment as disclosed herein. Initially, the steps 602A-608A is performed as described in the FIG. 6A. At step 602D, the method includes measuring the amplitude and the phase of each encoded pilot. The method allows the amplitude and phase measurement unit 408 to measure the amplitude and the phase of each encoded pilot.

At step 604D, the method includes transmitting the measured amplitude and the phase through a control channel message to UE 106. The method allows the transmitter unit 410 to transmit the measured amplitude and the phase through a control channel message to UE 106. The diagonal element is explicitly signaled to the UE 106 using a control channel message. The UE 106 estimates the phase of the data symbol using pilots.

In THP encoding with user's U and Nt streams, the index of the streams allocated to the user need to be signaled to the user. This information may be signaled to the user along with resources allocated to the user using a control channel message. The signaling may include, the number of allocated streams for the user and the indices of the streams.

In an embodiment the pilot encoding/precoding may use same THP encoding used for data. In an embodiment that uses orthogonal pilots, a linear precoder such as Q* can be used to obtain amplitude and phase estimated.

Figure 7:
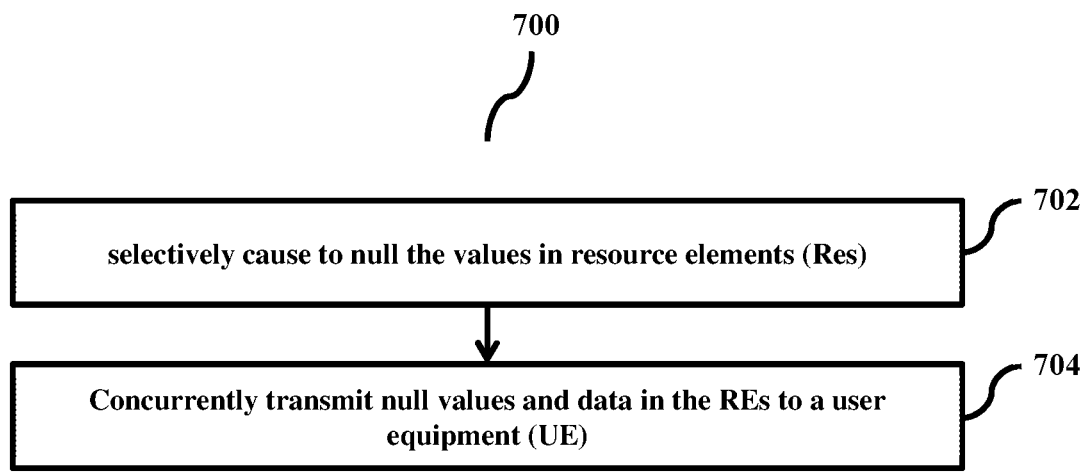
FIG. 7 is a flow diagram illustrating a method for concurrently transmitting null values and data to the UE, according to an embodiment as disclosed herein.

FIG. 7 is a flow diagram 700 illustrating a method for concurrently transmitting null values and data to the UE, according to an embodiment as disclosed herein.

At step 702, the method includes selectively causing to null the values in REs. The method allows the pilots selection unit 406 to selectively null the values in the REs.

In an embodiment, the pilot's selection unit 406 causes to null values in the position of data. These null elements are used for the purposes of estimating the residual noise-plus-interference at THP receiver output. In an example, THP data vector $$\begin{bmatrix} 0 \\ D_2 \\ D_3 \end{bmatrix}$$

can be used to measure the RNI for first stream. The Ds denote data symbols that are fed to THP. As a general rule, nulls may be transmitted by the cloud/massive MIMO BS in the position of data to enable RNI caused by the data of active neighboring beams/RRHs.

At step 704, the method includes concurrently transmitting null values and data in the REs to the UE 106. The method allows the transmitter unit 412 to concurrently transmit the null values and data in the REs to the UE 106. The transmitter unit 412 transmits data and null in the REs.

Figure 8:
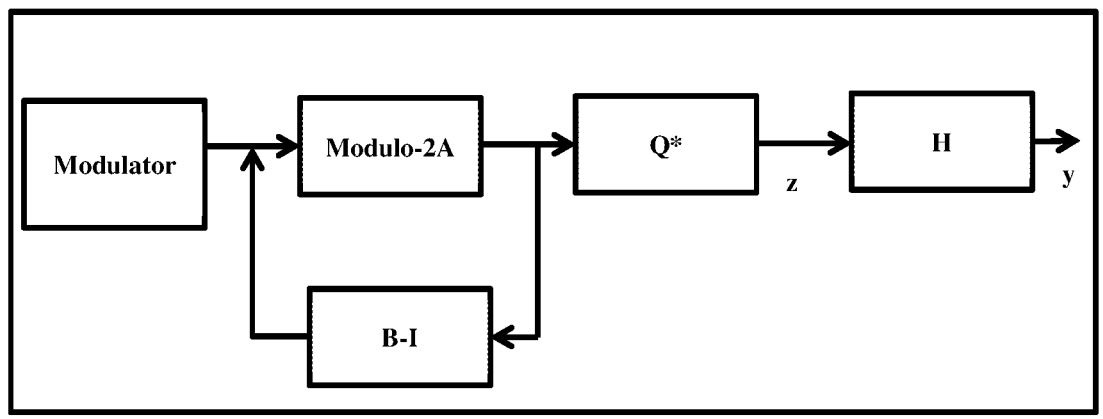
FIG. 8 illustrates a block diagram of transmitter unit in the C-RAN, according to an embodiment as disclosed herein.

FIG. 8 illustrates a block diagram of transmitter unit 412 in the C-RAN 112, according to an embodiment as disclosed herein. The THP encoding process is as described herein. The cloud radio/massive MIMO which is a collection of antenna ports selects UEs i.e., one UE is chosen from a pool of active UEs associated with each BS (using round-robin strategy). For the sake of illustration, the value of k=3 is assumed. OFDM systems are characterized by OFDM symbols and subcarriers. One subcarrier of a OFDM symbol is called a resource element (RE). It is assumed that the THP operation for any one subcarrier of an OFDM system that is one RE and this operation can also be extended to all the resource elements assigned for the user.

THP without modulo operation may incur with an increased transmit signal power penalty. Thus, a modulo operator at the transmitter unit 302 and at the receiver unit 412 in the UE is employed to limit the magnitude of the transmitted symbol and this makes THP a non-linear scheme. A THP without modulo operation will perform at least as the linear precoding schemes with similar power levels.

As depicted in the FIG. 8, the THP structure consists of a feedback and feed-forward filter at the transmitter unit 302. The feedback filter cancels the inter-stream interference successively while the feedforward filter ensures that the noise at the decision devices is spatially white. Modulo Operation is used to limit the power of the transmitted signal. In THP Operation, modulo-2 A operation is used. It bounds the magnitude of the transmitted signal in [−A, A]. A is calculated as:

$$A = \left( \frac{M}{\frac{2 \cdot (M-1)}{3}} \right)^{1/2}$$

For QPSK, M=4 and A=1.4 For 16 QAM, M=16, A=1.26 For 64 QAM, M=64, A=1.23. Note that different antenna ports may use different modulation-types.

The symmetric modulo operation is defined as:

$$\mathrm{mod}_A(x) = x - 2A\left[\frac{x}{2A}\right],$$

where [ ] indicates the flow operation.

The above modulo operation can be interpreted as a method to find integer values, m and n, such that the following inequalities are satisfied:

$$-A-jA \leq \mathrm{mod}_A(x)=x+2Am+j2An \leq A+jA$$

The Channel matrix H is decomposed to L and Q matrices using LQ decomposition where L is a lower triangular matrix and Q is a Unitary matrix. Practically, QR decomposition of H* is implemented. L and L values are derived from R* and Q*, where R is an upper triangular matrix. The QR decomposition always exists, even if the matrix does not have full rank, so the constructor will never fail. The primary use of the QR decomposition is in the least squares solution of non-square systems of simultaneous linear equations.

$$L = \begin{bmatrix} l_{11} & 0 & 0 \\ l_{21} & l_{22} & 0 \\ l_{31} & l_{32} & l_{33} \end{bmatrix}$$

B in the feedback filter is defined like this:

$$B = L * S^{-1}$$

where S is a diagonal matrix whose diagonal entries same as that of L and $S^{-1}$ is the inverse of S. S is defined as:

$$S = \begin{bmatrix} l_{11} & 0 & 0 \\ 0 & l_{22} & 0 \\ 0 & 0 & l_{33} \end{bmatrix}$$

and $S^{-1}$ as $$S^{-1} = \begin{bmatrix} 1/l_{11} & 0 & 0 \\ 0 & 1/l_{22} & 0 \\ 0 & 0 & 1/l_{33} \end{bmatrix}$$

B is obtained as:

$$B = \begin{bmatrix} 1 & 0 & 0 \\ l_{21}/l_{22} & 1 & 0 \\ l_{31}/l_{33} & l_{32}/l_{33} & 1 \end{bmatrix}$$

-continued i.e., $$B_{21} = l_{21}/l_{22};$$
$$B_{31} = l_{31}/l_{33};$$
$$B_{32} = l_{32}/l_{33};$$

B−I is a strictly lower triangular matrix.ie, diagonal elements have value as 0. From the schematic, $$-(B-I)\bar{x}+x=\bar{x}$$

By expanding the equation, it can be obtained as $$\bar{x}_1 = \mathrm{mod}_{2A}(x_1);$$
$$\bar{x}_2 = \mathrm{mod}_{2A}(x_2 - B_{21}\bar{x}_1);$$
$$\bar{x}_3 = \mathrm{mod}_{2A}(x_3 - B_{31}\bar{x}_1 - B_{32}\bar{x}_2);$$

From the block diagram, transmitted vector is:

$$z = Q^{**}\bar{x}$$

Figure 9:
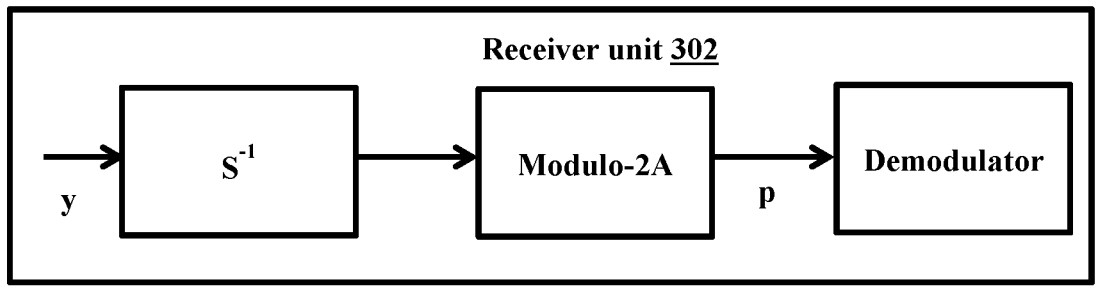
FIG. 9 illustrates a block diagram of a receiver unit in the UE, according to an embodiment as disclosed herein.

FIG. 9 illustrates a block diagram of the receiver unit 302 in the UE, according to an embodiment as disclosed herein. As shown in the FIG. 9, the receiver unit 312 receives the signal vector in downlink is given as:

$$y = Hx + n \quad (1)$$

where y is the received signal vector, $$H = \frac{1}{\sqrt{K}} \begin{bmatrix} h_{11}r_{11}^{-\alpha/2} & h_{12}r_{12}^{-\alpha/2} & h_{13}r_{13}^{-\alpha/2} \\ h_{21}r_{21}^{-\alpha/2} & h_{22}r_{22}^{-\alpha/2} & h_{23}r_{23}^{-\alpha/2} \\ h_{31}r_{31}^{-\alpha/2} & h_{32}r_{32}^{-\alpha/2} & h_{33}r_{33}^{-\alpha/2} \end{bmatrix}$$

where $x=[x_1\ x_2\ x_3]$ is the transmitted symbol vector with $E[|x_i|^2]=P_T$ and $n=[n_1\ n_2\ n_3]$, with $n_i \in CN(0,1)$ is AWGN. Expanding the equation (1) gives $$y_1 = \frac{1}{\sqrt{K}}(h_{11}r_{11}^{-\alpha/2}x_1 + h_{12}r_{12}^{-\alpha/2}x_2 + h_{13}r_{13}^{-\alpha/2}x_3) + n_1;$$
$$y_2 = \frac{1}{\sqrt{K}}(h_{21}r_{21}^{-\alpha/2}x_1 + h_{22}r_{22}^{-\alpha/2}x_2 + h_{23}r_{23}^{-\alpha/2}x_3) + n_2;$$
$$y_3 = \frac{1}{\sqrt{K}}(h_{31}r_{31}^{-\alpha/2}x_1 + h_{32}r_{32}^{-\alpha/2}x_2 + h_{33}r_{33}^{-\alpha/2}x_3) + n_3;$$

i.e., each UE's received signal consists of signals received from the all the BSs. For first user, signals received from BS2 and BS3 are considered as interferences. Precoders are mainly designed to remove these interference effects.

Received Vector y is:

$$y = H^*z + n$$
$$= H*Q^* *Q^* *\bar{x} + n$$
$$= L*x + n$$

Expanding y Provides:

$$y_1 = l_{11}\bar{x}_1 + n_1;$$
$$y_2 = l_{21}\bar{x}_1 l_{22}\bar{x}_2 + n_2;$$
$$y_3 = l_{31}\bar{x}_1 + l_{32}x_2 + l_{33}\bar{x}_3 + n_3;$$

Using modulo values for $\bar{x}$, implies $$y_1 = l_{11}\mathrm{mod}_{2A}(x_1) + n_1;$$
$$y_2 = l_{21}\mathrm{mod}_{2A}(x_1) + l_{22}\mathrm{mod}_{2A}(x_2 - B_{21}\mathrm{mod}_{2A}(x_1)) + n_2;$$
$$y_3 = l_{31}\mathrm{mod}_{2A}(x_1) + l_{32}\mathrm{mod}_{2A}(x_2 - B_{21}\mathrm{mod}_{2A}(x_1)) + l_{33}\mathrm{mod}_{2A}(x_3 - B_{31}\mathrm{mod}_{2A}(x_1) - B_{32}\mathrm{mod}_{2A}(x_2 - B_{21}\mathrm{mod}_{2A}(x_1))) + n_3;$$

Consider, $$\begin{bmatrix} p_1 \\ p_2 \\ p_3 \end{bmatrix} = \mathrm{mod}_{2A}\left(S^{-1}\begin{bmatrix} y_1 \\ y_2 \\ y_3 \end{bmatrix}\right)$$

$$= \mathrm{mod}_{2A}\left(\begin{bmatrix} 1/l_{11} & 0 & 0 \\ 0 & 1/l_{22} & 0 \\ 0 & 0 & 1/l_{33} \end{bmatrix}\begin{bmatrix} l_{11}(x_1 + 2Aa + j2Ab) + n_1 \\ l_{22}(x_2 + 2Ac + j2Ad) + n_2 \\ l_{33}(x_3 + 2Ae + j2Af) + n_3 \end{bmatrix}\right)$$

$$= \begin{bmatrix} x_1 \\ x_2 \\ x_3 \end{bmatrix} + \begin{bmatrix} \bar{n}_1 \\ \bar{n}_2 \\ \bar{n}_3 \end{bmatrix}$$

where effective noise at the receiver $\bar{n}$ is given by:

$$\begin{bmatrix} \bar{n}_1 \\ \bar{n}_2 \\ \bar{n}_3 \end{bmatrix} = \begin{bmatrix} \frac{n_1}{l_{11}} + 2Aa1 + j2Ab1 \\ \frac{n_2}{l_{22}} + 2Ac1 + j2Ad1 \\ \frac{n_3}{l_{33}} + 2Ae1 + j2Af1 \end{bmatrix}$$

By observing above equations, after dividing the received signal by taking the modulo operation of the received signals, all other terms except the signals from the corresponding BS cancels out for each UE's received signal. Thus the received signals become free from interference.

It is evident from the equation that the noise at the receiver unit 312 is scaled down by a factor corresponding to the channel characteristics. The demodulator input in the transmitter is same as that of modulator output at the receiver unit 312 i.e., it ensures reliable communication in the cloud/Massive MIMO network.

The following method is used where the magnitude and phase of the data symbols can be estimated more accurately. This method uses a pilot transmission method that allows the pilots to experience the entire THP operation so that the received pilots facilitate estimation of the phase and/or magnitude of diagonal elements.

As an example, consider the three user case. In three distinct subcarrier positions, the following pilot vectors are transmitted:

$$\begin{bmatrix} C \\ 0 \\ 0 \end{bmatrix}, \begin{bmatrix} 0 \\ C \\ 0 \end{bmatrix}, \begin{bmatrix} 0 \\ 0 \\ C \end{bmatrix}$$

As input to the THP encoder or non-linear encoder where each pilot vector is transmitted using THP precoding or non-linear encoder operation in different REs. Here C indicates a real/complex-valued pilot that a fixed value forms the QAM constellation. Furthermore, pilot transmission can be repeated in multiple OFDM symbols in other subcarrier positions as well. This pilot position can be indicated by the FDM or the CDM pattern of the reference signals assigned to the users. This is indicated to the users via the control channel.

At the receiver side, user-1 collects the THP encoded pilots corresponding to all the pilot transmissions $$\begin{bmatrix} C \\ 0 \\ 0 \end{bmatrix}$$

and uses the received signal for estimation of the phase and/or magnitude of the diagonal elements that will be used for data demodulation. Since each stream is received free of interference, the user can estimate both the magnitude and phase of the diagonal elements using this type of pilots. Specifically, the received signal for user 1 may be represented as $$y_i = \vec{l}_{11} e^{j\theta_1} C + \vec{n}_1;$$

Where the magnitude of the diagonal element may be slightly different from the ideal value and there may be a phase rotation of $\theta_1$ experience by the user. Further, due to channel mismatch, the user may experience some residual interference plus thermal noise that is represented by the term $\vec{n}_1$.

The magnitude and phase terms can be estimated by the user using multiple such pilot signals that are transmitted over multiple REs.

Similarly, other users will collect the THP encoded pilots corresponding to that user for estimation of phase and/or magnitude of the diagonal elements that will be used for data demodulation. If the user employs multiple streams, then each stream would have its own THP encoded pilot for estimating the phase and/or magnitude of the diagonal elements that will be used for data demodulation of the stream.

Every BS/RRH transmits single/multiple data streams. Each user has multiple antenna ports and can possibly receiver single/multiple data streams. The BS/cloud scheduler determines the total number of streams participating in the THP encoding process. If Ns is the total number of streams used by the BS/cloud, then Ns orthogonal vectors are used where each vector has single constant value C (or some other value) in the position corresponding to the stream and zero elsewhere. The Ns orthogonal vectors are transmitted in multiple subcarrier positions in the same or distinct OFDM symbol positions using THP encoding. To improve the accuracy of phase and/or magnitude of diagonal element, each stream may use multiple resource elements (Res that is subcarrier positions in same or/distinct OFDM symbols) for pilot transmission where same pilot vector is used in these multiple resource elements.

Using null positions for noise, interference and noise-plus-interference power estimation: In the presence of channel mismatch, and estimation errors some residual interference may be present during data demodulation. The user may use the signals received in REs corresponding to null positions (corresponding to zero pilot values) for estimating the residual noise, or interference or the noise-plus-interference power estimation. IN another embodiment, the user may estimate the interference power from other cells on the non-zero power CSI-RS reference signals which are configured by the base station in order to estimate the interference from adjacent cells. In an embodiment, the user divides the signals received in the null positions by the magnitude of appropriate diagonal values and uses these observations for estimating the residual noise-plus-interference power. Multiple such null pilot positions may be used to average the noise-plus-interference power estimates to obtain residual noise-plus-interference (RNI) estimate.

UE-CQI feedback: The UE may measure the signal power as a square of the diagonal element for each RE. The UE may measure the RNI for each RE. For each RE, the ratio of signal power and RNI gives the subcarrier level signal-to-noise-plus-interference (SINR) estimate. Alternatively, the UE may average the RNI values over multiple RE elements to obtain average RNI. The measurement window may span a group of subcarriers in frequency and a group of subcarriers in time. The ratio of signal-power of a RE to average RNI may also provide an estimate of SINR for the RE. The UE may use SINR estimates of multiple REs to map it to a single effective SINR or a CQI value that corresponds to a modulation and coding scheme (MCS).

Another embodiment of the present disclosure is Diagonal Element Signaling (DES) Pilots: Method-3

This type of pilot transmission enables estimation of magnitude of the diagonal elements. Let $$y = Hx + n$$

The data vector x is encoded as Q*p $$y = HQ^*p + n$$

It simplifies as $y = LQQ^*p + n = Lp + n$

In the presence of perfect CSI at the cloud/massive MIMO BS, the diagonal entries are determined by using pilots of the form:

$$\begin{bmatrix} C \\ 0 \\ 0 \end{bmatrix}, \begin{bmatrix} 0 \\ C \\ 0 \end{bmatrix}, \begin{bmatrix} 0 \\ 0 \\ C \end{bmatrix}$$

With this pilot encoding the received signals become $$y_1 = l_{11}C + n_1;$$

$$y_2 = l_{22}C + n_2;$$

$$y_3 = l_{33}C + n_3;$$

These observations together with pilots transmitted is other REs can be used by the users to estimate the diagonal element values. In practice, there will be variation in the magnitude and phase values of the diagonal elements due to channel mismatch. The does go though THP encoding while this type of pilot encoding goes though only part of THP encoding process i.e., pre-multiplication with Q* matrix. Therefore, this this type of pilot encoding may be used to estimate the magnitudes of the diagonal elements.

In another embodiment of method-3, the BS/cloud transmits a pilot vector where some elements of the THP pilot vector take zero values. For instance, BSs/RRHs that cause high mutual interference mutually mute pilot transmissions whereas the BSs/RRHs that cause less mutual interference transmit THP pilots simultaneously. This type of transmission reduces the pilot overhead significantly. This type of pilot encoding may be applied to non-THP case such as zero-forcing, MMSE, etc. In this case, instead of Q matrix pilot data is precoded with a matrix-valued filter that is designed to suppress interference. The pilot vector may be composed of some zero and some non-zero elements.

Signaling of stream index: In THP encoding which uses U, users and Nt streams, the index of the streams allocated to the user need to be signaled to the user. This information may be signaled to the user along with resources allocated to the user using a control channel message. The signaling may include, the number of allocated streams for the user and the indices of the streams.

In an embodiment, the user can feedback the entire channel matrix in case of FDD systems or the best Eigen vector, or the projection of the channel along the specified directions indicated by the base station using a control channel In another embodiment, the BS can indicate the number of bits that the channel can be quantized into and the user will feedback the channel matrix (or vector) of the appropriate dimensions. For instance, when the UE indicates the BS that it supports N antennas, the BS can indicate the user that it needs to feedback M channel elements for the M antenna elements at the BS, then the user will feedback N*M elements either in full resolution or a fixed "K" bit resolution as indicated by the BS to the UE.

Figure 10A:
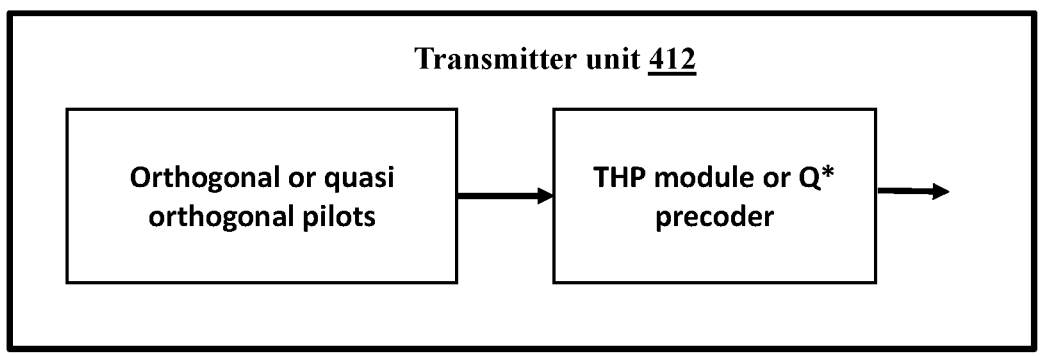
FIG. 10A illustrates a pilot transmission module in the transmitter unit in which a pilot vector is transmitted through either a THP transmitter module or a linear precoder, according to an embodiment as disclosed herein.

FIG. 10A illustrates a pilot transmission module in the transmitter unit 412 in which a pilot vector is transmitted through either a THP transmitter module or a linear precoder, according to an embodiment as disclosed herein.

In an embodiment, the pilot vector may be an orthogonal vector which is a non-zero value in the $i^{th}$ position (where i is the index) and zeros elsewhere. P=[0 0 p 0 0 . . . ].

In another embodiment the pilot values are combination of zero values as well as non-zero values. One pilot vector is transmission on one RE (resource element). Multiple REs many be used to transmit multiple pilot vectors to enable phase and/or gain estimation of single/multiple data streams corresponding to multiple BSs/RRHs for a RE of interest.

Figure 10B:
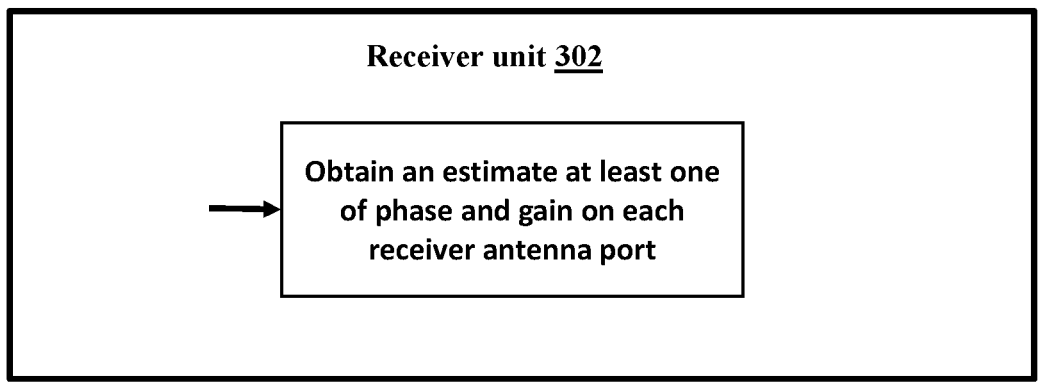
FIG. 10B illustrates the receiver unit of the UE for estimating gain and phase values, according to embodiment as disclosed herein.

FIG. 10B illustrates the receiver unit 302 of the UE for estimating gain and phase values, according to embodiment as disclosed herein. The gain and phase values are estimated at the receiver unit 302 for each receiver antenna port of the receiver for a RE. The phase/gain values of a RE are estimated directly using the received pilot signal that is received on the REs that contain a pilot signal of interest.

Figure 11A:
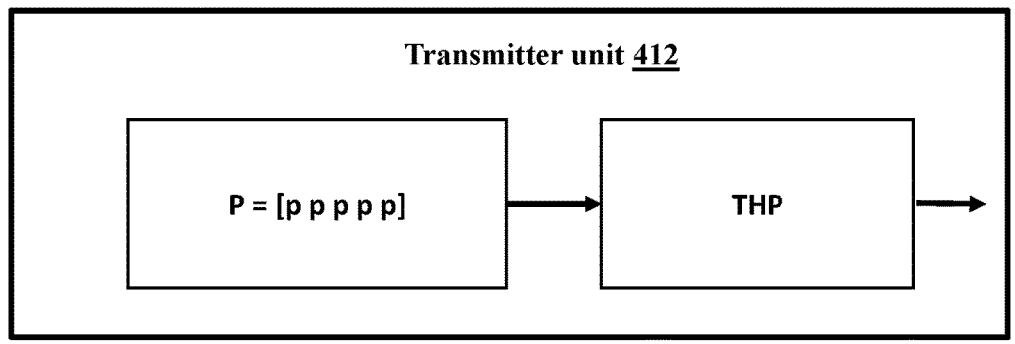
FIG. 11A illustrates another pilot transmission module in the transmitter unit in which a pilot vector is transmitted, according to an embodiment as disclosed herein.

FIG. 11A illustrates another pilot transmission module in the transmitter unit in which a pilot vector is transmitted, according to an embodiment as disclosed herein. In an embodiment the pilot vector values can be the form P=[p, p, p, . . . ] that has non-zero values.

In another embodiment, the pilot values can be combination of zero values as well as non-zero values. This type of pilot transmission enables phase estimation for multiple data streams transmitted by a BS/RRHs.

Figure 11B:
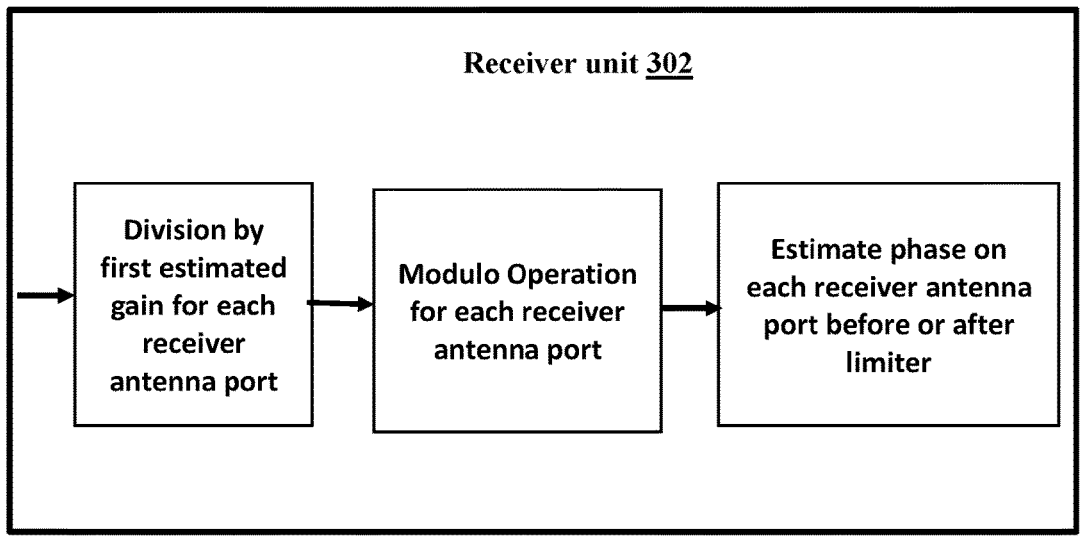
FIG. 11B illustrates the receiver unit of the UE for suppression of interference, according to an embodiment as disclosed herein.

FIG. 11B illustrates the receiver unit 302 of the UE for suppression of interference, according to an embodiment as disclosed herein. The receiver unit 302 utilizes the knowledge of gain on each receiver antenna port and applies division by a gain on each antenna port for a given RE. Further, the receiver unit 302 applies modulo operation which results in elimination (suppression) of interference caused by the interfering pilots. The receiver unit 302 further measures the phase rotation after the modulo operation. The phase rotation may be measured either before or after the signal limiter operation. This type of pilot transmission enables the phase estimation with a low pilot overhead. The said gain values on each receiver antenna port of a RE is obtained either using an orthogonal pilot transmission/reception method described in the FIGS. 10a and 10b or the gain values may be explicitly signaled to the user using a control channel with low delay. The control channel may be a user specific control channel or physical downlink control channel (PDCCH) that is common to a group of users.

Figure 12A:
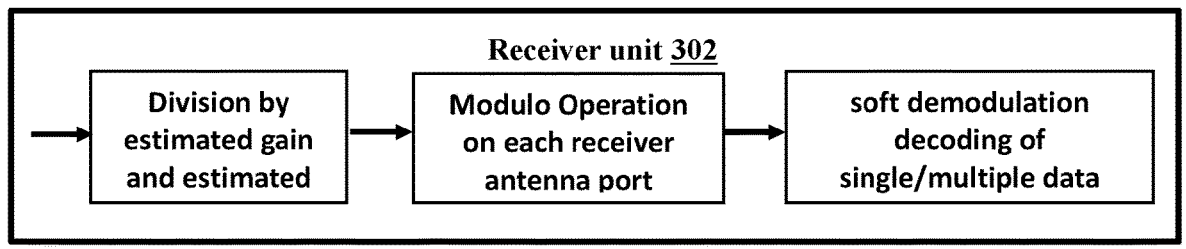
FIG. 12A illustrates a THP based data demodulation receiver unit of the UE, according to an embodiment as disclosed herein.

FIG. 12A illustrates a THP based data demodulation receiver unit 302 of the UE, according to an embodiment as disclosed herein. The receiver unit 302 employs phase and gain compensation before modulo operation followed by soft demodulation for each data stream.

Figure 12B:
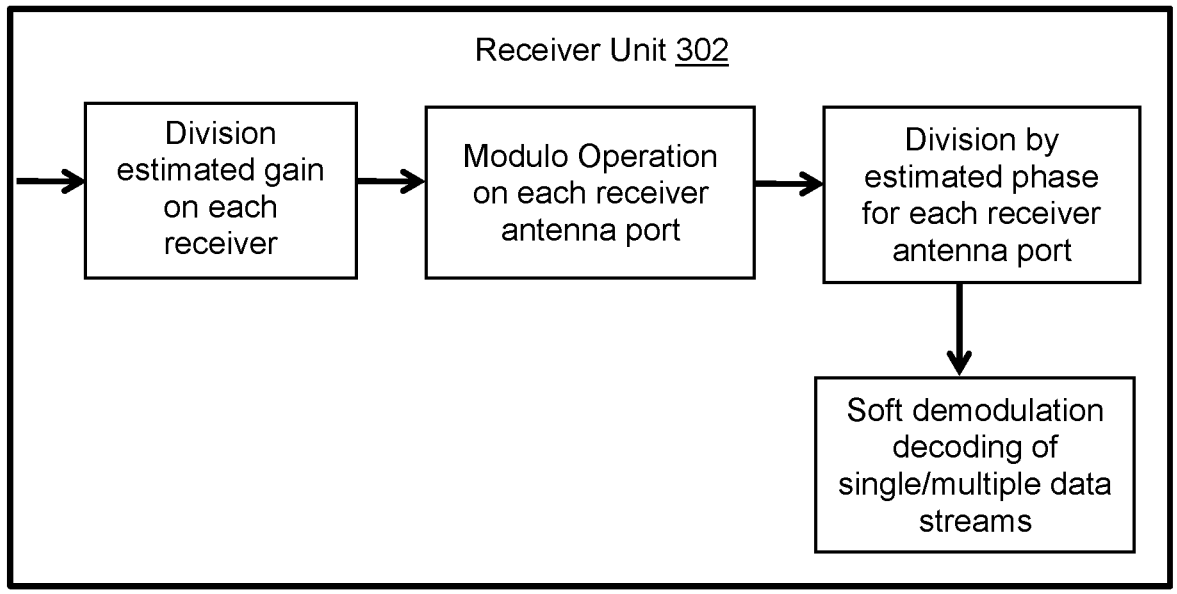
FIG. 12B illustrates another THP based data demodulation receiver unit of the UE, according to an embodiment as disclosed herein.

FIG. 12B illustrates another THP based data demodulation receiver unit 302 of the UE, according to an embodiment as disclosed herein. The receiver unit 302 employs gain compensation for each receiver antenna port of a RE before modulo operation followed by phase compensation for each receiver antenna port of a RE after the modulo operation. Further, soft demodulation for each data stream.

A C-RAN or a BS configuring the non-linear precoding on or off to a user via a control channel message of a higher layer signaling indication via MAC layer or RRC. The message can be via DCI or MAC-CE or RRC indication.

A C-RAN or a base station configuring periodicity of the operation of the non-linear precoding or a linear precoding scheme over indicated time durations. The time periods can be such that larger time period for linear precoding and smaller time scales for non-linear precoding. NLP works well with dense users and in cases when accurate channel knowledge is available from the users. The SRS periodicity can be configured accordingly to the user to support NLP or linear techniques. A user may be configured with "X" ms and "Y" ms where "X<Y" and the user uses NLP for every X ms and every Y ms the user switches to linear techniques.

The embodiments disclosed herein can be implemented using at least one software program running on at least one hardware device and performing network management functions to control the elements.

A method implemented in a user equipment (UE), the method comprising: receiving a signal with encoded pilots from a cloud radio access network (C-RAN); identifying a definite value from a plurality of values in the received signal; utilizing the encoded pilots to measure amplitude and a phase of the identified definite value; and estimating a residual noise-plus-interference (RIN) in each resource element (RE) in the received signal. The method further comprises measuring a channel quality index (CQI) based on the measured amplitude, the phase and the estimated RIN; and transmitting the measured CQI to the C-RAN. The method further comprises estimating gain and phase A method implemented in a cloud radio access network (C-RAN), the method comprising: grouping a plurality of remote radio heads (RRHs); identifying at least one neighboring RRH from the plurality of RRHs causing interference based on intensity of the interference; and selecting a plurality of encoded pilots of the at least one neighboring RRH from the plurality of RRHs not causing interference. The method further comprises transmitting the plurality of encoded pilots to a user equipment (UE). The method further comprises selectively causing to null the values of the identified at least one neighboring RRH causing dominant interference. The method further comprises selectively causing to null the values of an identified at least one neighboring RRH causing dormant interference. The method further comprises measuring amplitude and a phase associated with each encoded pilot. The method further comprises transmitting the measured amplitude and the phase through a control channel message to a user equipment (UE).

A method implemented in a cloud radio access network (C-RAN), the method comprising: selectively causing to null the values in resource elements (REs); and concurrently transmitting null values and data in the REs to a user equipment (UE).

A user equipment (UE) comprises a receiver unit configured to receive a signal with encoded pilots from a cloud radio access network (C-RAN); a definite value identification unit configured to: identify a definite value from a plurality of values in the received signal; amplitude and phase measurement unit configured to measure amplitude and a phase of the identified definite value by utilizing encoded pilots; and residual noise-plus-interference (RIN) estimation unit configured to estimate a RIN in each resource element (RE) in the received signal. The UE further comprises a channel quality index (CQI) measurement unit configured to measure a CQI based on the measured amplitude, the phase and the estimated RIN; and a transmitter unit configured to transmit the measured CQI to the C-RAN.

A cloud radio access network (C-RAN) comprises a remote radio head (RRH) grouping unit configured to group a plurality of RRHs; a neighboring RRH identification unit configured to identify at least one neighboring RRH from the plurality of RRHs causing interference based on intensity of the interference; and pilot's selection unit configured to select a plurality of encoded pilots of the at least one neighboring RRH from the plurality of RRHs not causing interference. The C-RAN further comprises a transmitter unit configured to transmit the plurality of encoded pilots to a user equipment (UE). The C-RAN further comprises a null insertion unit configured to selectively cause to null the values of the identified at least one neighboring RRH causing dominant interference. The null insertion unit configured to selectively causing to null the values of an identified at least one neighboring RRH causing dormant interference.

The C-RAN further comprises an amplitude and phase measurement unit configured to measure amplitude and a phase associated with each encoded pilot. The C-RAN further comprises a transmitter unit configured to transmitting the measured amplitude and the phase through a control channel message to a user equipment (UE).

A cloud radio access network (C-RAN) comprising a null insertion unit configured to selectively causing to null the values in resource elements (REs); and a transmitter unit configured to concurrently transmitting null values and data in the REs to a user equipment (UE).

A cloud radio access network or a base station comprising a channel state information reference signal for interference power estimation at the user A C-RAN or a BS configuring a user with shared channel resources to feedback the entire channel matrix in case of FDD systems, or the best Eigen vector, or the principal component of the channel matrix after projecting onto the required sub spaces.

A C-RAN or a BS configuring the non-linear precoding on or off to a user via a control channel message of a higher layer signaling indication via MAC layer or RRC.

A C-RAN or a base station configuring periodicity of the operation of the non-linear precoding or a linear precoding scheme over indicated time durations.

Figure 13:
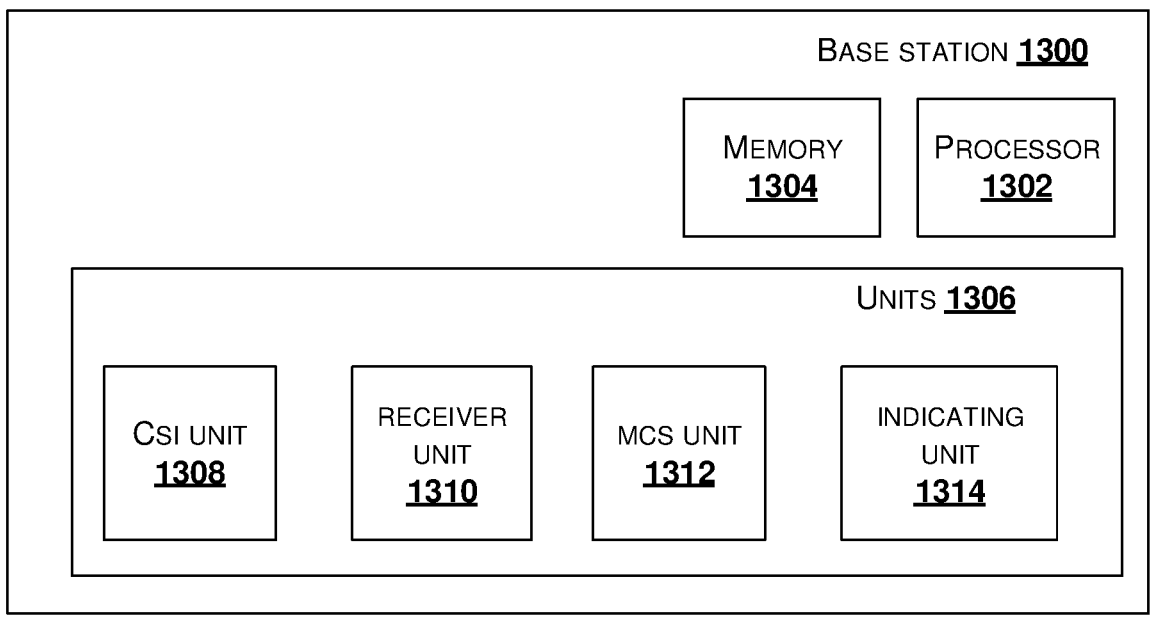
FIG. 13 shows a block diagram of a base station (BS) to determine modulation and coding scheme (MCS), in accordance with an embodiment of the present disclosure.

FIG. 13 shows a block diagram of a base station (BS) to determine modulation and coding scheme (MCS), in accordance with an embodiment of the present disclosure.

As shown in FIG. 13, the BS 1300 comprises a processor 1302, and memory 1304 coupled with the processor 1302. The BS 1300 is also referred as a communication system or communication apparatus. The processor 1302 may be configured to perform one or more functions of the BS 1300 to determine modulation and coding scheme (MCS). In one implementation, the BS 1300 may comprise units 1306, also referred as blocks or modules, for performing various operations in accordance with the embodiments of the present disclosure.

The units 1306 includes a channel state information (CSI) unit 1308, receiver unit 1310, a modulation and coding scheme (MCS) 1312, and a transmitting unit 1314. The CSI unit 1308 is also referred as downlink CSI (DL-CSI) determining unit or DL-CSI estimation unit. The MCS unit 1312 is also referred MCS determining unit.

The CSI unit 1308 obtains downlink channel state information (DL-CSI) corresponding to a plurality of UEs. The CSI unit 1308 obtains DL-CSI corresponding to the plurality of UEs using one of internal calibration of the UL channel state information measurements, calibration aided by explicit channel feedback from the plurality of UEs, and explicit full or quantized downlink channel state feedback from the plurality of UEs. The receiver unit 1310 receives feedback from the plurality of UEs, said feedback is at least one of explicit interference power and noise power feedback, post processing signal power-to-interference power plus noise power-based feedback.

The MCS unit 1312 determine MCS associated with a subset of UEs from the plurality of UEs using a predefined mapping between the MCS and a combination of DL-CSI and the feed, which may be referred as the DL-CSI plus the feedback, from the plurality of UEs. The predefined mapping is one of post processing signal-to-noise-plus-interference (SINR) of linear precoding, post processing SINR of non-linear precoding, and the like. The linear precoding is performed by one of zero-forcing (ZF) precoding, maximum ratio transmission (MRT), a regularized MMSE precoding, and the like. The non-linear precoding is performed by one of Tomlinson Harashima Precoding (THP), vector perturbation, lattice-based strategies and the like. The indicating unit 1314 to indicate the determined MCS to the subset of UEs from the plurality of UEs.

Figure 14:
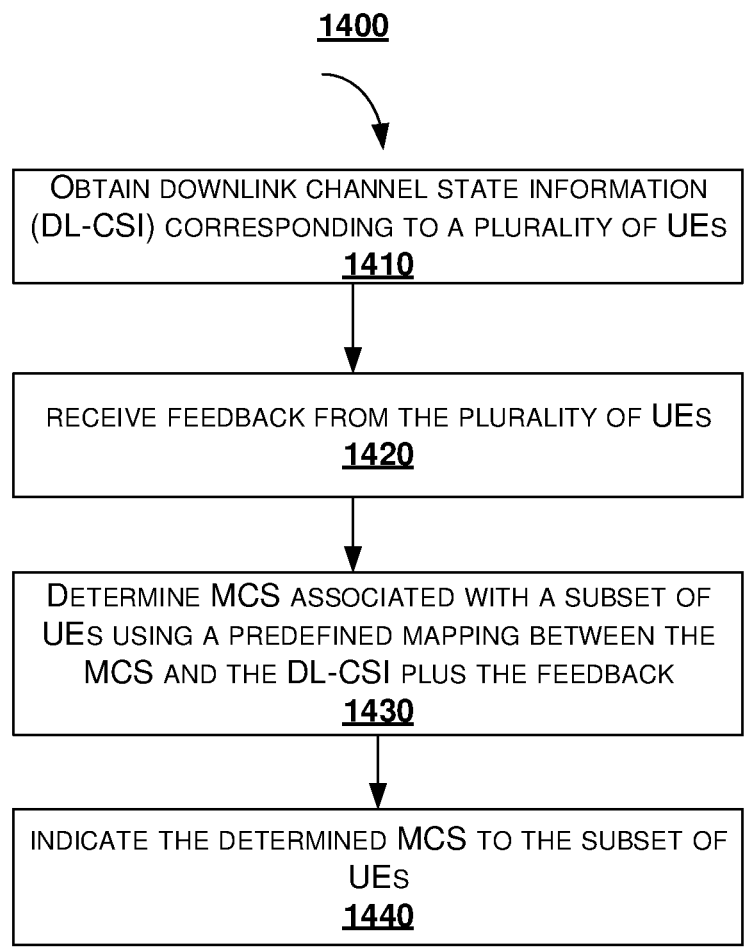
FIG. 14 shows a flowchart illustrating a method of determining modulation and coding scheme (MCS) at a base station (BS), in accordance with some embodiments of the present disclosure.

FIG. 14 shows a flowchart illustrating a method of determining modulation and coding scheme (MCS) at a base station (BS), in accordance with some embodiments of the present disclosure.

As illustrated in FIG. 14, the method 1400 comprises one or more blocks of a method of determining modulation and coding scheme (MCS) at a base station (BS). The method 1400 may be described in the general context of computer executable instructions. Generally, computer executable instructions can include routines, programs, objects, components, data structures, procedures, modules, and functions, which perform functions or implement abstract data types.

The order in which the method 1400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 1410, obtaining downlink channel state information (DL-CSI) corresponding to a plurality of UEs, by CSI unit 1308 configured in the base station (BS) 1300. The DL-CSI corresponding to the plurality of UEs is obtained using one of internal calibration of the UL channel state information measurements, calibration aided by explicit channel feedback from the plurality of UEs, and explicit full or quantized downlink channel state feedback from the plurality of UEs.

At block 1420, receiving a feedback by the receiver unit 1310, configured in the BS 1300, from the plurality of UEs. The feedback is at least one of explicit interference power and noise power feedback, post processing signal power-to-interference power plus noise power-based.

At block 1430, determining a MCS associated with a subset of UEs from the plurality of UEs is performed by the MCS unit 1312 configured, in the BS, using a predefined mapping between the MCS and a combination of DL-CSI and the feedback from the plurality of UEs. The predefined mapping is one of post processing signal-to-noise-plus-interference (SINR) of linear precoding, post processing SINR of non-linear precoding, and the like. The linear precoding is performed by one of zero-forcing (ZF) precoding, maximum ratio transmission (MRT), a regularized MMSE precoding, and the like. The non-linear precoding is performed by one of Tomlinson Harashima Precoding (THP), vector perturbation, lattice-based strategies and the like.

At block 1440, indicating the determined MCS to the subset of UEs from the plurality of UEs, is performed by the indicating unit 1314 configured in the BS 1300.

In an embodiment, for instance to be useful for the case of FDD systems, the UE may estimate the channel at the UE side and feedback the entire channel matrix, or a quantized channel matrix, or a compressed version of the channel matrix e.g. by using support vector machines, principal component analysis or techniques thereof, in order to convey the full channel information to the base station. The BS can thereafter use the same for estimating the channel quality on downlink of the BS-UE link and use it for appropriate loading of the users. In here, loading refers to the modulation and coding scheme assigned to the user among a plurality of the users. In addition to the channel matrix, the interference and noise power from the users is also needed at the base station in order to estimate the best modulation and coding scheme required for the user.

For instance, the post processing SINR at a user using THP is given by $$\frac{l_{ii}^2}{I+N},$$

wherein $l_{ii}$ is the ith diagonal element of the LQ decomposition of the channel matrix which is the effective channel gain at the ith user, and I and N are the interference and Noise power estimates at the user. This metric gives an estimate of the capacity of the channel between ith user and the BS which is used for determining the modulation and coding scheme that can be assigned to this user when the BS performs multi user downlink transmissions. Similar mechanisms can be followed for the linear precoding case such as zero-forcing. The initial MCS loading done by this method can thereafter be further enhanced by using the feedback from the UE which it will send periodically. This mechanism is significantly beneficial for the initial MCS assignment for the users which will ensure that no packet losses happen in this transmission scheme and also ensure faster convergence of the proportional fair metrics, BLER metrics, etc. to the required target thresholds.

Both I and N will be useful in estimating the interference in the cell, and noise at the users. As an example, the interference estimates at each user gives the BS an estimate of the sectoral interference seen by the users. This facilitates initial MCS setting for the users, detection threshold setting in PRACH stage among others. The interference estimate (I) can be estimated using the CSI reference signals such as NZP-CSI RS signals, wherein the concerned BS does not transmit any RS but the cells from other sites transmit some data/reference signals and the user can estimate the measured interference levels. The UE can also measure interference and noise also on null-tones configured by the intended BS wherein the intended BS does not transmit any signals but other cell sites may do so. Using all this information, the capacity of the network can be significantly enhanced.

In another embodiment, once a channel matrix is obtained by the BS from several users, the channel can be re-ordered by the BS and the DMRS ports can be assigned to the users in a manner which replicates the strength of the channel. In other words, the rows of the channel matrix can be re-ordered in the descending order of the values $l_{ii}$ since it indicates the power of the channel at the ith user. Then the strongest user can be removed from the subsequent users without causing much interference in the iterations of the THP algorithm. This channel vector re-ordering can be reflected as part of the DMRS port mapping to the users. For instance, DMRS port 1 can be assigned to the user/channel vector to the strongest value of $l_{ii}$.

In another embodiment, the SRS transmitted by the users towards the BS is used in order to estimate the channel H. However, the SRS transmissions include the power transmitted by the users and the pathloss incurred by the users in the channel in the uplink. The effective channel at the BS is shown as H=D$\tilde{H}$, wherein D is the power matrix including ul transmit power and pathloss and $\tilde{H}$ is the residual channel. The THP algorithm should be run on this residual channel in the downlink as the effect of the various power levels of the users must be compensated before THP algorithm is executed.

In another embodiment, the DL channel for each of the users will be estimated by the base station using the received UL channel and then using the stored calibration coefficients to compensate for the DL-UL channel differences. Another method to do is to feedback an explicit channel from the user from at least one resource element in the uplink and then the base station internally calibrates and estimates the downlink channel.

In one embodiment, for every user or user equipment scheduled by the BS or the CRAN unit, it must be allotted a specific modulation and coding scheme (MCS), using which data is sent to the UE. The MCS setting is as per the channel conditions seen by the user or UE. Better channel conditions imply that, the UE can be assigned better MCS i.e. higher order modulation scheme, such as 256-QAM with higher code rates. In case of worst channel means the UE will be assigned lower order modulation schemes, such as BPSK and QPSK with low code rates (heavy coding) to ensure decoding can happen. This setting of MCS is very crucial because setting a wrong MCS may lead to heavy retransmissions and setting a conservative MCS may lead to overall lesser network throughput. Typically, the MCS may be set as per the true channel conditions seen at the user in the downlink and SINR metric is one way which can be used to identify the channel conditions and then set this MCS for the user. Hence, getting the correct SINR value is crucial for the BS and it must be available from each user. For example, once a user sends the channel matrix to the BS, then $$\frac{l_{ii}^2}{N}$$

can be used as the initial SINR estimate from the user and first MCS setting can be based on this, when a THP method is implemented. Later on when MU-MIMO is activated then the UE can feedback the actual interference measurements as well and then the BS may use $$\frac{l_{ii}^2}{I+N}$$

as the true MU-MIMO SINR metric and then set the MCS for the user when THP method is used for DL MU-MIMO. For example, when MCS is set for the user with a specific DL MU-MIMO method, similar values using the appropriate SINR metric, for zero forcing or vector perturbation etc., need to be used. Then, the MCS will be indicated to the UE on the downlink via the control channel such as PDCCH. Table-1 below shows examples of MCS entries:

TABLE 1

| MCS Index $I_{MCS}$ | Modulation Order $Q_m$ | Target code Rate x [1024] R | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |

The BS picks a particular index from the Table-1, and will indicate to the UE about this index. Then, the UE will know the modulation order and the coding rate assigned with that specific transmission. Based on this the UE will decode the necessary data transmissions, in an embodiment.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

A description of an embodiment with several components in communication with each other does not imply that all such components are required. On the contrary a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description. Accordingly, the disclosure of the embodiments of the invention is intended to be illustrative, but not limiting, of the scope of the invention.

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A method of determining modulation and coding scheme (MCS) at a base station (BS), the method comprising:
   obtaining, by the BS, downlink channel state information (DL-CSI) corresponding to a plurality of UEs;
   receiving, by the BS, feedback from the plurality of UEs, said feedback is at least one of explicit interference power and noise power feedback, post processing signal power-to-interference power plus noise power-based;
   determining, by the BS, MCS associated with a subset of UEs from the plurality of UEs using a predefined mapping between the MCS and a combination of DL-CSI and the feedback from the plurality of UEs; and
   indicating, by the BS, the determined MCS to the subset of UEs from the plurality of UEs, wherein the DL-CSI corresponding to the plurality of UEs is obtained using one of internal calibration of the UL channel state information measurements, calibration aided by explicit channel feedback from the plurality of UEs, and explicit full or quantized downlink channel state feedback from the plurality of UEs.

2. The method as claimed in claim 1, wherein the predefined mapping is one of post processing signal-to-noise-plus-interference (SINR) of linear precoding, and post processing SINR of non-linear precoding.

3. The method as claimed in claim 2, wherein the linear precoding is performed by one of zero-forcing (ZF) precoding, maximum ratio transmission (MRT), and a regularized MMSE precoding.

4. The method as claimed in claim 2, wherein the non-linear precoding is performed by one of Tomlinson Harashima Precoding (THP), vector perturbation, and lattice-based strategies.

5. A base station (BS) to determine modulation and coding scheme (MCS), the BS comprising:
   a channel state information unit to obtain a downlink channel state information (DL-CSI) corresponding to a plurality of UEs;
   a receiver unit to receive feedback from the plurality of UEs, said feedback is at least one of explicit interference power and noise power feedback, post processing signal power-to-interference power plus noise power-based;
   a MCS unit to determine MCS associated with a subset of UEs from the plurality of UEs using a predefined mapping between the MCS and a combination of the DL-CSI and the feedback from the plurality of UEs; and
   an indicating unit to transmit the determined MCS to the subset of UEs from the plurality of UEs, wherein the CSI unit obtains DL-CSI corresponding to the plurality of UEs using one of internal calibration of the UL channel state information measurements, calibration aided by explicit channel feedback from the plurality of UEs, and explicit full or quantized downlink channel state feedback from the plurality of UEs.

6. The BS as claimed in claim 5, wherein the predefined mapping is one of post processing signal-to-noise-plus-interference (SINR) of linear precoding, and post processing SINR of non-linear precoding.

7. The BS as claimed in claim 6, wherein the linear precoding is performed by one of zero-forcing (ZF) precoding, maximum ratio transmission (MRT), and a regularized MMSE precoding.

8. The BS as claimed in claim 6, wherein the non-linear precoding is performed by one of Tomlinson Harashima Precoding (THP), vector perturbation, and lattice-based strategies.

* * * * *